(12) United States Patent
Bricklin et al.

(10) Patent No.: US 6,268,851 B1
(45) Date of Patent: *Jul. 31, 2001

(54) HYPERMEDIA AUTHORING AND PUBLISHING SYSTEM

(75) Inventors: Daniel S. Bricklin, Newton; Peter Levin, Watertown; Micah Zimring, Boston; Winslow B. Kelley, Natick; George Adams, Lincoln, all of MA (US)

(73) Assignee: Trellix Corporation, Concord, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/723,301

(22) Filed: Sep. 30, 1996

(51) Int. Cl.[7] .................................................. G06F 17/00
(52) U.S. Cl. ........................................ 345/335; 707/501
(58) Field of Search ................................... 345/335, 348, 345/349, 326; 707/501, 513

(56) References Cited

U.S. PATENT DOCUMENTS

| | | |
|---|---|---|
| 4,982,344 | 1/1991 | Jordan . |
| 5,072,412 | 12/1991 | Henderson, Jr. et al. . |
| 5,204,947 | 4/1993 | Berstein et al. . |
| 5,241,655 | 8/1993 | Mineki et al. . |
| 5,297,249 | 3/1994 | Berstein et al. . |
| 5,333,237 | 7/1994 | Stefanopoulos et al. . |
| 5,333,256 | 7/1994 | Green et al. . |
| 5,428,735 | 6/1995 | Kahl et al. . |
| 5,442,795 * | 8/1995 | Levine et al. ..................... 345/349 X |
| 5,446,891 | 8/1995 | Kaplan et al. . |
| 5,471,399 | 11/1995 | Tanaka et al. . |
| 5,479,602 | 12/1995 | Baecker et al. . |
| 5,485,567 | 1/1996 | Banning et al. . |
| 5,491,795 | 2/1996 | Beaudet et al. . |
| 5,504,853 | 4/1996 | Shuur et al. . |

(List continued on next page.)

OTHER PUBLICATIONS

Bolter, Jay David et al. "Getting Started with Storyspace for Windows," Eastgate Systems, Inc., 1996.

Primary Examiner—Joseph H. Feild
(74) Attorney, Agent, or Firm—The Hecker Law Group

(57) ABSTRACT

The present invention comprises a novel system for authoring and publishing hypermedia works. The present invention includes a scrollable contents map window in which a graphical representation of a hypermedia work is displayed. The contents map window contains graphical lexia symbols representing the lexia of the hypermedia work, empty space, and other graphical and text elements. Links between lexia are not ordinarily displayed. Selecting a lexia symbol causes the corresponding lexia to be displayed in a lexia display window. The lexia symbols representing lexia may be arranged in the window in any configuration. Freely movable text labels and other graphical elements may be placed anywhere in the contents map window. Additional special purpose graphical elements may be placed in the contents map window to create relationships among lexia. In one embodiment, a number of different modes of the contents map window can be displayed. One mode is a caricature mode. In caricature mode, lexia are represented by novel, information rich, dynamic lexia symbols with enhanced mnemonic features and visual cues called "caricatures". The mnemonic features and visual cues of a caricature, together with its position with respect to other elements in the contents map, provide means for uniquely visually identifying the underlying lexia. One embodiment of the invention includes a search function that allows an author or a reader to search some or all of the lexia of a work for specific words, phrases, or other items such as links. Lexia symbols of each lexia containing the searched for text are highlighted in the contents map window.

77 Claims, 21 Drawing Sheets

U.S. PATENT DOCUMENTS

| | | |
|---|---|---|
| 5,506,952 | 4/1996 | Choy et al. . |
| 5,533,183 | 7/1996 | Henderson, Jr. et al. . |
| 5,546,517 | 8/1996 | Marks et al. . |
| 5,546,526 | 8/1996 | Li et al. . |
| 5,586,316 | 12/1996 | Tanaka et al. . |
| 5,630,080 * | 5/1997 | Malamud et al. ............... 345/347 X |
| 5,632,022 | 5/1997 | Warren et al. . |
| 5,694,594 | 12/1997 | Chang . |
| 5,708,845 | 1/1998 | Wistendahl et al. . |
| 5,845,299 * | 12/1998 | Arora et al. .......................... 707/513 |
| 5,870,088 * | 2/1999 | Washington et al. ................ 345/326 |
| 5,874,963 * | 2/1999 | Johnson et al. ...................... 345/348 |
| 5,898,434 * | 4/1999 | Small et al. .......................... 345/348 |
| 5,910,803 * | 6/1999 | Grau et al. ........................... 345/357 |
| 5,911,145 * | 6/1999 | Arora et al. .......................... 707/514 |

\* cited by examiner

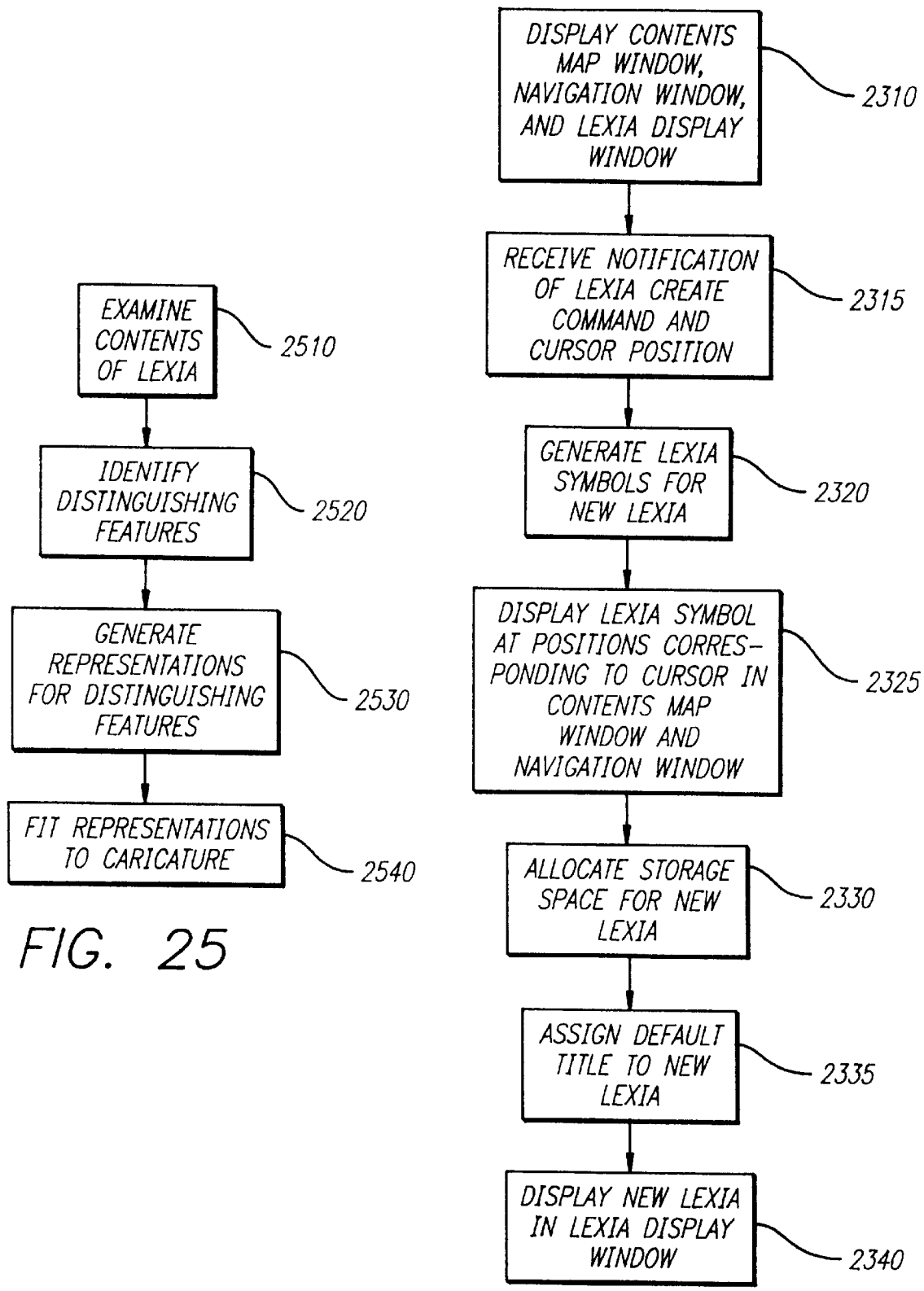

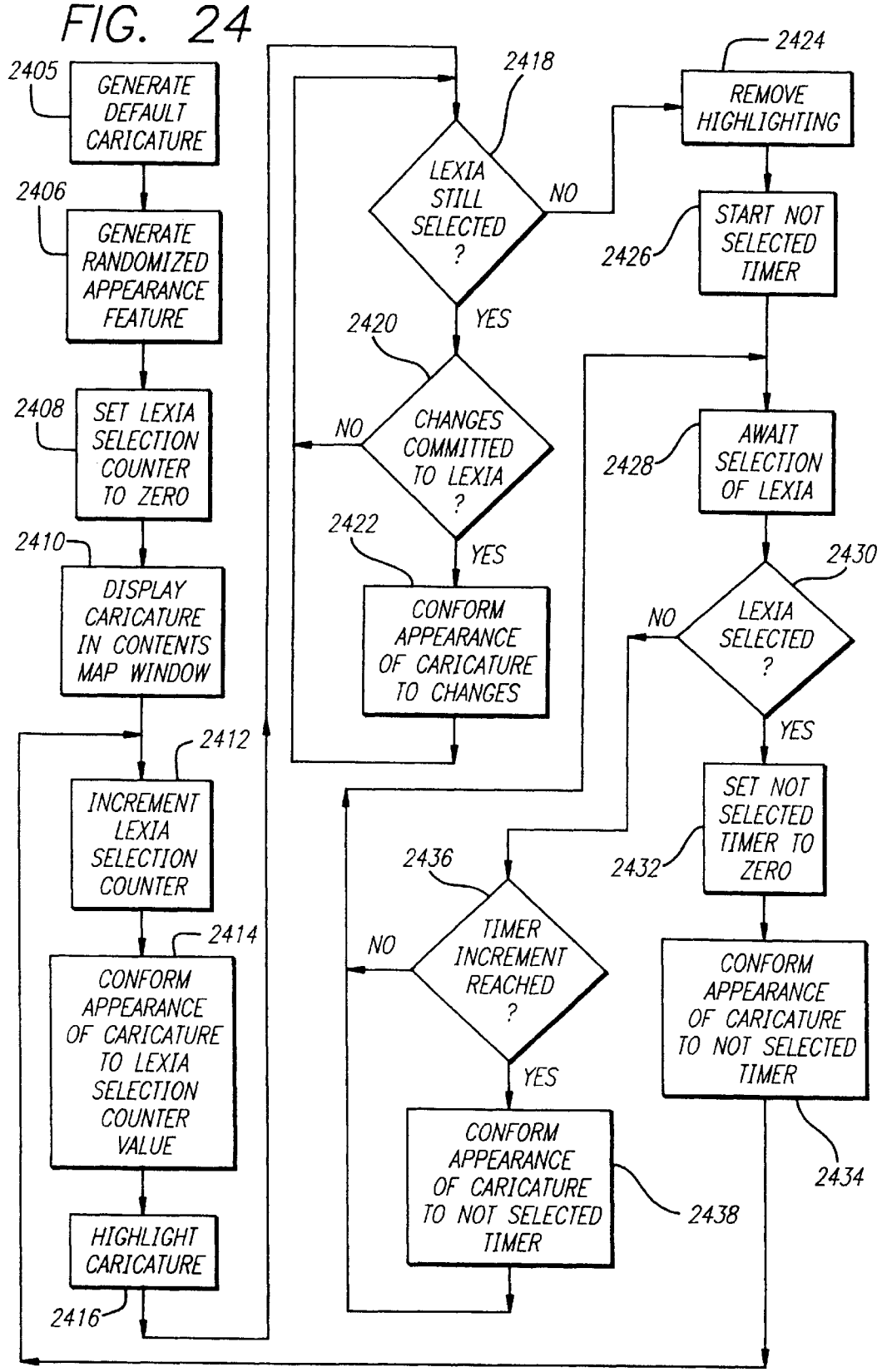

HYPERMEDIA AUTHORING AND PUBLISHING SYSTEM

BACKGROUND OF THE INVENTION

1. Field of the Invention

The present invention relates to the field of hypermedia authoring and publishing systems.

2. Background Art

Hypertext and hypermedia refer to electronic documents or works for display on electronic media such as computer display screen. Hypermedia works do not have the serial structure of printed documents in which information is presented to a reader in a fixed order. Instead, information is presented to a reader in an order interactively determined by the reader.

In a hypermedia work, information is organized into individual portions called "lexia". Lexia can be viewed as containers of data. Data contained in lexia may include text, graphics, motion video and sound data. A lexia of a hypermedia work may contain one or more embedded links to other lexia. An example of a link is a highlighted word of text. Selecting the highlighted word, for example using a mouse, initiates display of the lexia to which the highlighted word is linked. This lexia may contain additional links, both back to the previous lexia and/or to other lexia or documents.

One common use of hypermedia is in computer software help files. FIG. 1 is an illustration of an example lexia from a help file such as that used in the Microsoft Windows (™) operating system. As shown in FIG. 1, lexia 100 includes a title bar 110, a text window 115, and a button bar 140. Title bar 110 contains the title of the lexia. For lexia 100, the title is "How to Use Help." Text window 115 contains the data for lexia 100, which in this case is text data describing the basic operations of Windows Help. Text window 115 also contains a number of link activation areas that provide links to other lexia. These link activation areas, designated items 125, 130 and 135 in FIG. 1, are indicated in text window 115 by bold facing and underlining of the words that constitute the links. Link activation area 125 consists of the word "links". Link activation area 130 consists of the word "maximize". Link activation area 135 consists of the word "minimize." Link activation areas 125, 130 and 135 link particular locations of lexia 100 to other lexia.

Button bar 140 contains a number of additional link activation areas in the form of buttons 120a–120b. Button 120a, labeled "Contents", provides a link to a table of contents lexia. Button 120b, labeled "Back", provides a link to the previously displayed lexia. Because the previously displayed lexia changes according to the path used to get to lexia 100, the lexia linked to by button 120a changes over time. The link provided by button 120a is therefore a dynamic link that links to different lexia at different times. Buttons 120a and 120b link lexia 100 as a whole to other lexia.

FIG. 2 shows the lexia that is opened by activating link activation area 125 (i.e. the word "links") of lexia 100. As shown in FIG. 2, lexia 200 contains a glossary entry for the term "Links". Like lexia 100 of FIG. 1, lexia 200 includes a data window 210, a title bar 215, and link activation buttons 220a and 220b. Lexia 200 also contains link activation areas 225 and 230 comprising the words "Help topics" and "pointer", respectively.

The complex, dynamic inter-linked nature of a hypermedia work makes it difficult for both authors and readers to form an accurate and meaningful picture of the hypermedia work as a whole. Prior art hypermedia authoring and publishing (or reading) systems have attempted to provide graphical representations of hypermedia works by focusing on ways to show links between lexia.

One prior art graphical depiction of a hypermedia work is illustrated in FIG. 3. As shown in FIG. 3, this prior art system depicts each lexia as the target of incoming links and the source of outgoing links. In the example of FIG. 3, the hypermedia work consists of ten lexia, represented by boxes labeled "Lexia 1" through "Lexia 10". The hypermedia work is depicted by three repeated columns of the ten lexia. In the first column, Lexia 1–10 are identified by numbers 301–310, in the second column by numbers 311–320, and in the third column by numbers 321–330. A link from one lexia to another is shown as an arrow from the source lexia to the target lexia. The second column shows all incoming and outgoing links for each lexia. For example, Lexia 2 has incoming links from Lexias 1, 3, and 6. Accordingly, each of Lexias 1, 3 and 6 contain a link to Lexia 2. Lexia 2 is shown as having outgoing links to Lexias 1, 5 and 9. Accordingly, Lexia 2 contains links to Lexias 1, 5 and 9. FIG. 5 is an alternative view of the prior art representation of FIG. 3 showing only the incoming and outgoing links for Lexia 2.

The hypermedia work illustrated in FIG. 3 consists of only ten lexia. Even with this small number of lexia, FIG. 3 is confusing and complex. As a result, it does not provide a meaningful overview of the structure and content of the underlying hypermedia work. For a typical work containing several times the number of lexia shown in FIG. 3, the graphical representation of FIG. 3 is even less satisfactory.

Another prior art method for graphically representing a hypermedia work is shown in FIG. 4. FIG. 4 shows the same hypermedia work shown in FIG. 3. In the representation shown in FIG. 4, Lexia 1–10 are located at movable locations in window 400. Links between lexia are shown as arrows from the source lexia to the target lexia. The position of each lexia can be changed by the user, for example by dragging with a mouse. As a lexia moves, the arrows indicating links remain attached. As is evident from FIG. 4, this representation of a hypermedia work also fails to provide an easily understandable overview of the hypermedia work as a whole.

Authoring a hypermedia work involves creating each lexia to be included in the work and connecting the lexia with appropriate links. A variety of methods for creating and linking lexia are provided in the prior art.

U.S. Pat. No. 4,982,244 discloses a hypertext creation system in which lexia are displayed in the form of cards containing text. A first, blank card is created by activating the appropriate menu command. The blank card is supplied with an "autolink" button. Selecting the autolink button creates a second card automatically linked to the first, and also creates a link activation button on the first card. By choosing an appropriate menu command, the second card may also be provided with an autolink button allowing the creation of further links.

Another prior art hypertext creation system is the "Storyspace" software program from Eastgate Systems, Inc. In Storyspace, lexia called "writing spaces" are displayed as boxes on a computer display screen. A link from one writing space to another is created by selecting the source writing space, selecting an appropriate menu command, and selecting the target writing space. The link can be changed to a link from or to a particular location in a lexia by selecting either the source or target writing space, choosing an edit link menu command, and identifying particular text in the writing space as the beginning or end of the link, as appropriate.

Prior art hypermedia authoring and publishing systems, though providing basic mechanisms for creating and displaying links between lexia, fail to provide an easy to use authoring and reading environment that allows authors to easily create and organize and readers to easily navigate and comprehend a hypermedia work.

SUMMARY OF THE INVENTION

The present invention comprises a novel system for authoring and publishing hypermedia works, including hypertext documents. One feature of one embodiment of the present invention is a scrollable contents map window in which a graphical representation of a hypermedia work is displayed. In one embodiment, the contents map window is displayed across the top portion of a display screen, while a lexia display window is displayed on the display screen below the contents map window. The contents map window contains graphical lexia symbols representing the lexia of the hypermedia work, empty space, and other graphical and text elements. Links between lexia are not ordinarily displayed. Selecting the lexia symbol causes the corresponding lexia to be displayed in the lexia display window. The lexia symbols representing lexia may be arranged in the window in any configuration desired by the author, unconstrained by the actual structure of the underlying hypermedia work, and may be moved around at will by the author and/or a reader. The lexia symbols may be arranged in any manner that aids the author, and/or a reader in organizing and understanding the structure and content of the hypermedia work. Freely movable text labels and other graphical entities may be placed anywhere in the contents map window to aid in creating and/or reading the hypermedia work. In one embodiment, the present invention uses the method for navigating multiple independent windowed images disclosed in U.S. Pat. No. 5,621,430, which is incorporated by reference herein.

In one embodiment of the invention, additional graphical entities may be placed in the window to create relationships among lexia corresponding to lexia symbols that are placed on these additional entities. For example, one relation-creating graphical entity is a bar. This bar may be placed anywhere in the window at any orientation. By itself, it performs no function. However, if lexia symbols representing lexia are placed on the bar, links are created between the lexia represented by the lexia symbols according to the relative position of the lexia symbols on the bar. In one embodiment, one end of the bar represents a "previous" direction and the other end a "next" direction. For any two lexia symbols placed adjacent to each other on the bar, "next" and "previous" links will be created between the underlying lexia. The lexia corresponding to the lexia symbol placed closer to the "previous" end of the bar will be automatically supplied by the invention with a "next" button. Activating the "next" button from the lexia will bring up the lexia represented by the lexia symbol placed nearer the "next" end of the bar. Similarly, the lexia represented by the lexia symbol placed closer to the "next" end will be given a "previous" button that links to the lexia represented by the lexia symbol doser to the "previous" end. Lexia symbols may be moved around on the bar, inserted between other lexia symbols on the bar, added or removed from the bar, with all the links between the underlying lexia automatically updated to correspond to the new arrangement. More complex configurations for the graphical relation-creating entity, for example a grid, may be used, creating more complex relationships between lexia.

In one embodiment of the invention, graphical elements displayed in the contents map window provide "inheritance" characteristics and properties for lexia symbols that are disposed on the graphical elements.

In one embodiment of the invention, a number of different modes of the contents map window can be displayed. Different types of lexia symbols are displayed in each mode. Each type of lexia symbol provides a different package of information about the underlying lexia. One mode is a basic mode that provides a fundamental view of the hypermedia work. In this mode, the type of lexia symbol used to represent a lexia is a simple symbol such as a bitmap. In one embodiment, the symbol used is a colored dot. This type of symbol provides little information about the underlying lexia other than its relationship to the structure of the work as a whole. A second mode is a caricature mode. This mode provides more detailed information about the lexia in the underlying work than provided by the basic mode. In this mode, the type of lexia symbol used to represent a lexia is a novel, information rich, dynamic lexia symbol with enhanced mnemonic features and visual cues called a "caricature". The mnemonic features and visual cues of a caricature, together with its position with respect to other elements in the contents map, provide means for uniquely visually identifying the underlying lexia.

A caricature is not simply a scaled down image of the underlying lexia, but is derived algorithmically from the content of the underlying lexia. As such, the caricature becomes both a distinctive symbol for the lexia and a representation that aids an author and/or a reader in associating lexia content with a particular caricature, and helps an author and/or reader remember this association during subsequent navigation through a hypermedia work.

For a lexia that is in the form of a page of text, one embodiment of the invention represents the lexia as a caricature of the paragraph structure of the underlying page. The caricature uses groups of horizontal lines to represent paragraphs of text. Although the paragraph configuration displayed by the caricature corresponds to the paragraph configuration on the underlying page, there is no direct one-to-one correspondence between the lines displayed by the caricature and the lines of text in the lexia. The lines displayed on the caricature change dynamically in response to changes made to the structure of the underlying lexia.

In one embodiment, a caricature contains features that provide information about the access history of a lexia.

In one embodiment, a caricature for a lexia is originally displayed as a symbol such as a rectangle with sharply defined corners. As the lexia corresponding to the caricature is repeatedly accessed, either by an author while creating a work or by a reader reading the work, the sharp corners of the caricatures are smoothed. The more the underlying lexia is selected, the more the corners get rounded.

In one embodiment, the color of the caricature also provides information about the underlying lexia. The color of a caricature starts off a bright color such as white or yellow. The longer the underlying lexia is not selected, the darker the color of its caricature becomes. Thus it is easy at a glance to recognize the most used and least used lexia.

Caricatures may include additional visual cues, such as a v-shaped notch along an edge. In one embodiment, the position of the notch indicates the relative time, compared to other lexia, when the lexia was created.

Caricatures may also be provided with random or pseudo random features that are not based on any feature of the underlying lexia but that are added to a caricature to help distinguish the caricature from other caricatures. In one embodiment, a v-shaped notch is generated at a randomized position along the top edge of the caricature to give the caricature a unique appearance.

In one embodiment of the invention, a new lexia is created by moving a pointer to an empty location in the contents map window and activating a mouse button. A lexia symbol representing a new lexia is displayed at the indicated location, and an initially empty lexia is displayed in the lexia display window. If the caricature mode of the contents map window is active, the lexia symbol for the new lexia displayed in the contents map window is a caricature. An editing mode may be activated for the lexia display window. In the editing mode, editing tools are provided that allow text and graphics and hypermedia links to be added to the lexia. As the content of the lexia is edited, the caricature displayed in the contents map window changes to reflect the changed content of the lexia.

One embodiment of the present invention includes a search function that allows an author or a reader to search some or all of the lexia of a work for specific words or phrases. In one embodiment of the invention, all lexia containing the searched for text are highlighted in the contents map window. A reader thus can easily locate and access the lexia containing the desired text.

In one embodiment of the invention, an author may elect to provide a viewer of the author's hypermedia work a contents map having a different configuration than the contents map used by the author to create the work. In one embodiment, the author may designate that certain graphical elements contained in the contents map be visible only to the author, and not to a viewer.

BRIEF DESCRIPTION OF THE DRAWINGS

FIG. 23 is a block diagram of the process used to create a new lexia in one embodiment of the present invention.

FIG. 24 is a block diagram of the process used to display a caricature in one embodiment of the present invention.

FIG. 25 is a block diagram of the process used to conform a caricature to changes to the underlying lexia in one embodiment of the present invention.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known features have not been described in detail in order not to unnecessarily obscure the present invention.

Figure 1:
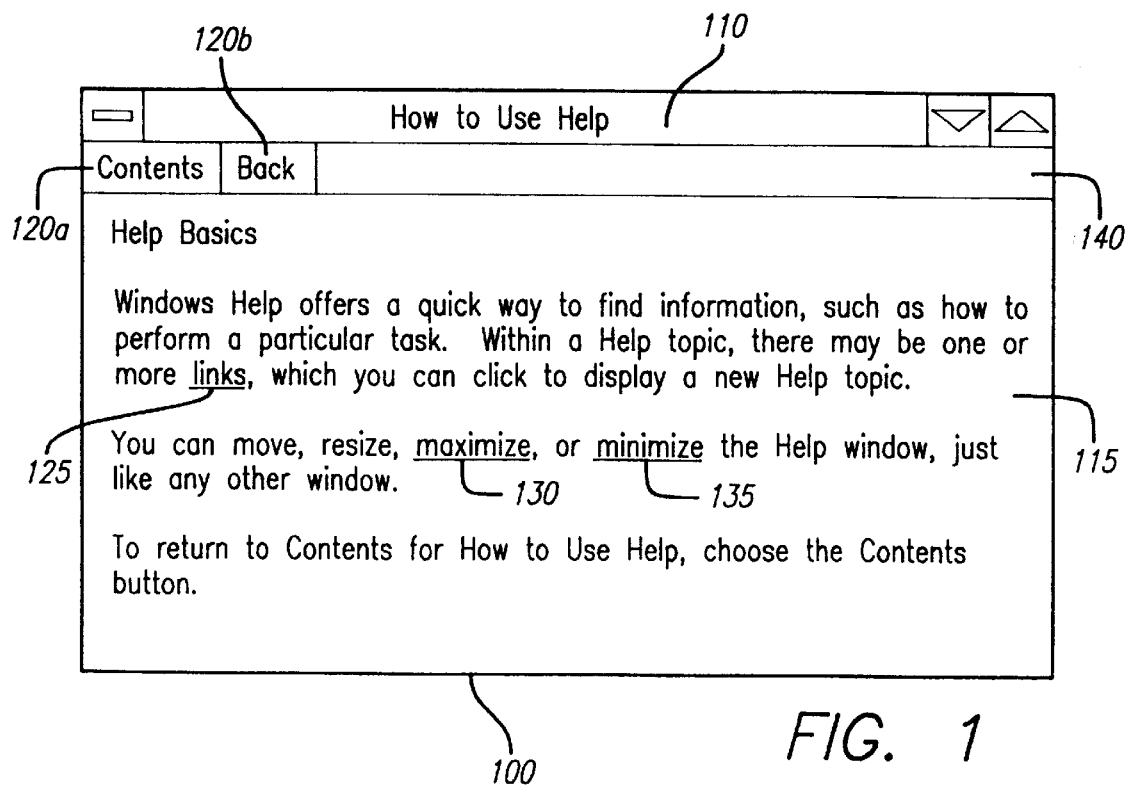
FIG. 1 is an illustration of a lexia.
Figure 2:
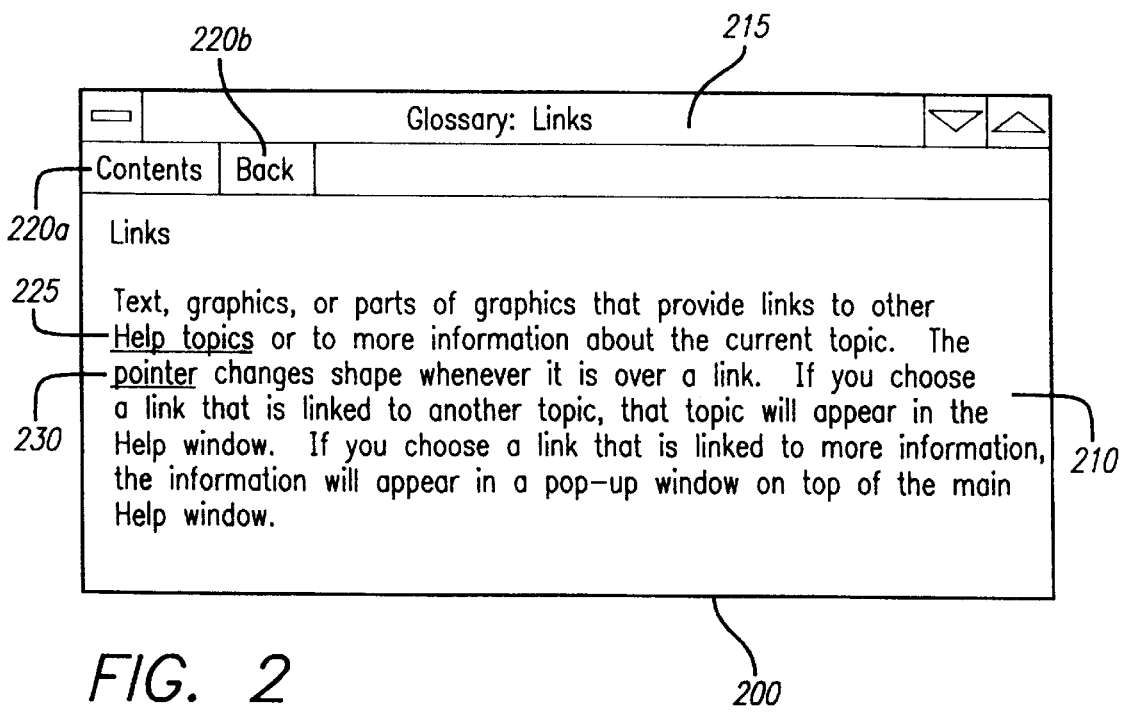
FIG. 2 is an illustration of a lexia accessed by activating a link contained in the lexia of FIG. 1.
Figure 3:
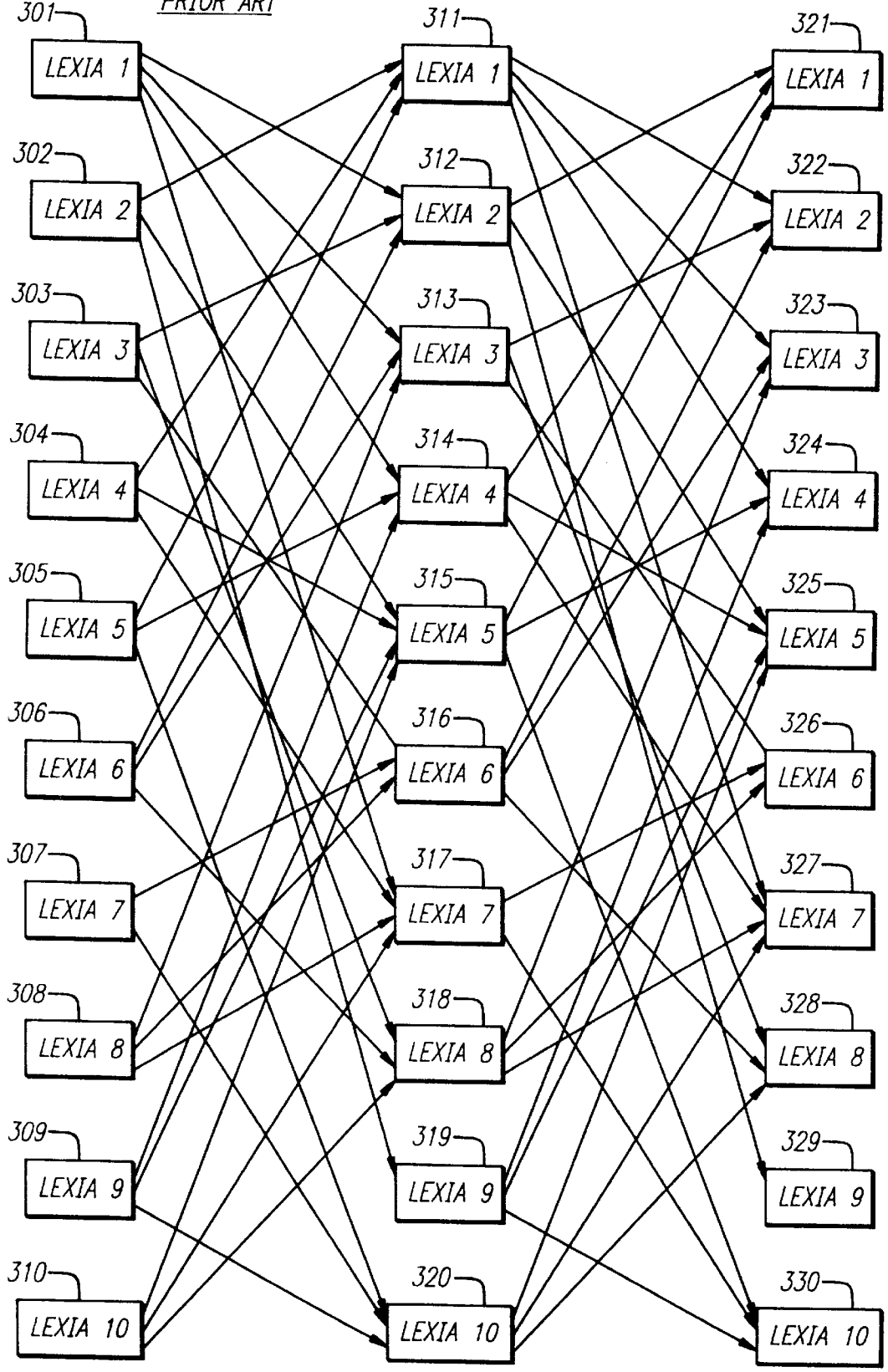
FIG. 3 is an illustration of one prior art graphical representation of a hypermedia work.
Figure 4:
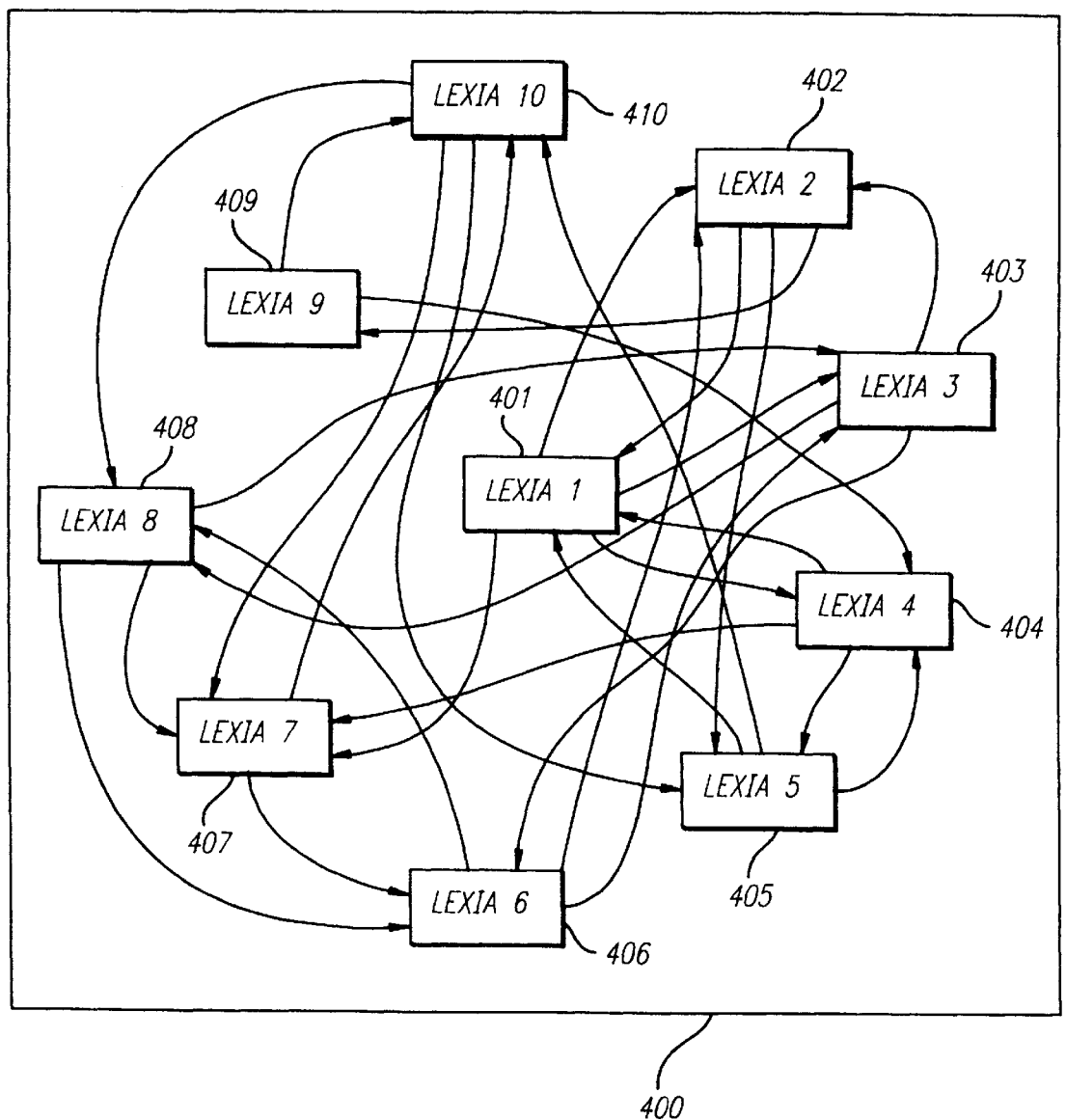
FIG. 4 is an illustration of a second prior art graphical representation of a hypermedia work.
Figure 5:
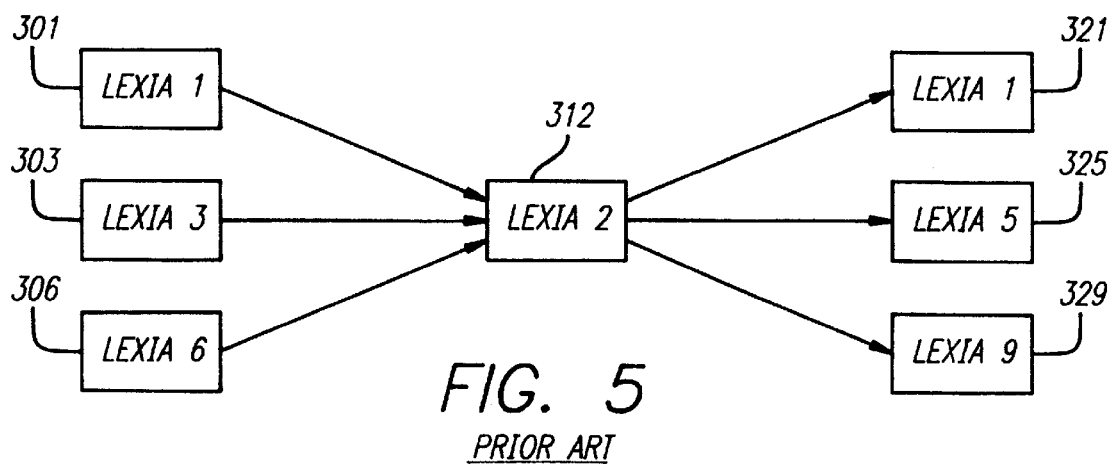
FIG. 5 is an alternate illustration of a portion of the prior art graphical representation of FIG. 3.
Figure 6:
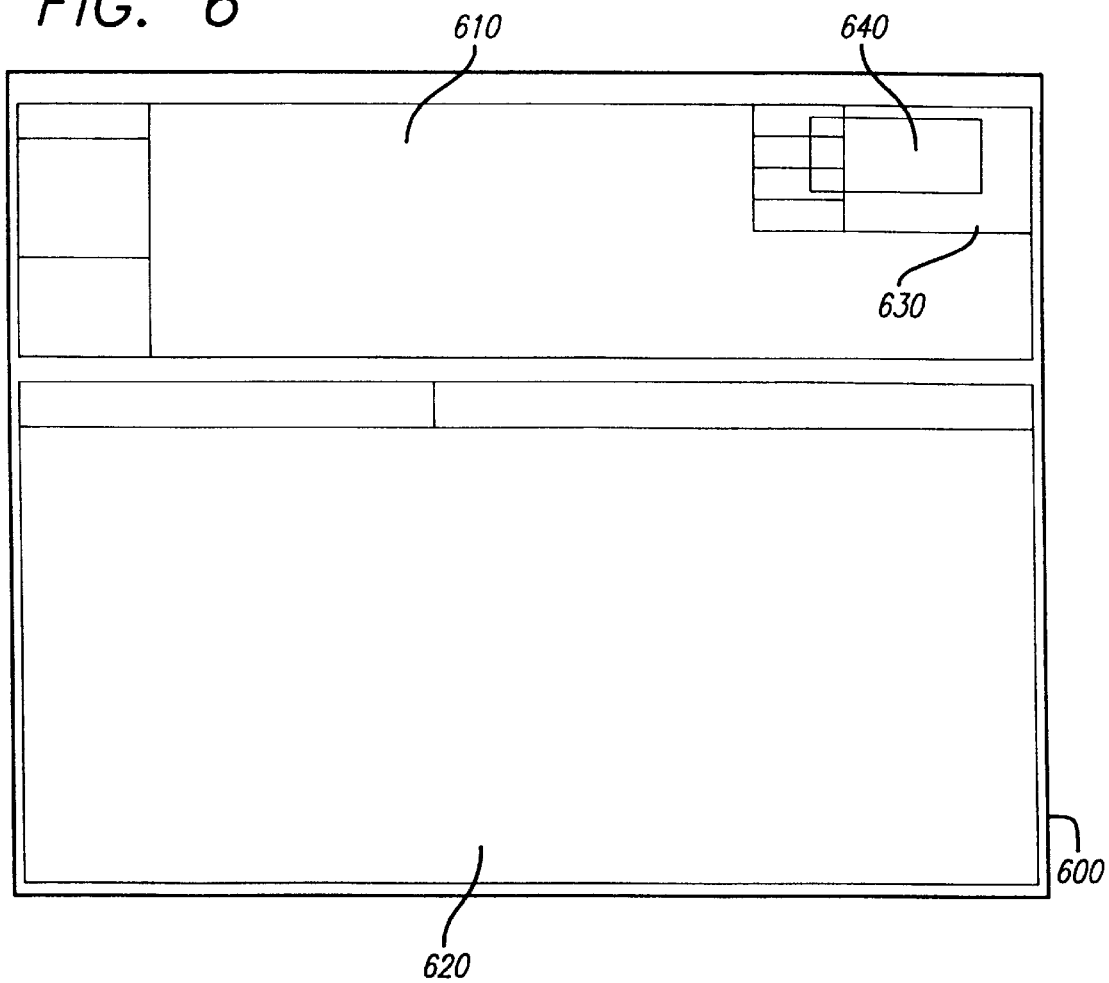
FIG. 6 is an illustration of a display screen from one embodiment of the present invention.

FIG. 6 is an illustration of a display screen displayed by one embodiment of the present invention on a display device such as a computer monitor. The embodiment of FIG. 6 operates on a computer system using a Windows (™) operating system from Microsoft Corporation. As shown in FIG. 6, in this embodiment, the display screen 600 includes a contents map window 610 and a lexia display window 620. In the configuration shown in FIG. 6, contents map window 610 and lexia display window 620 are arranged in a "tiled" configuration with contents map window 610 taking up approximately the top two-fifths of display screen 600 and lexia display window 620 taking up approximately the bottom three fifths of display screen 600. However, contents map window 610 and lexia display window 620 may be sized and positioned differently, and may overlap, as is well known in the art.

Figure 7:
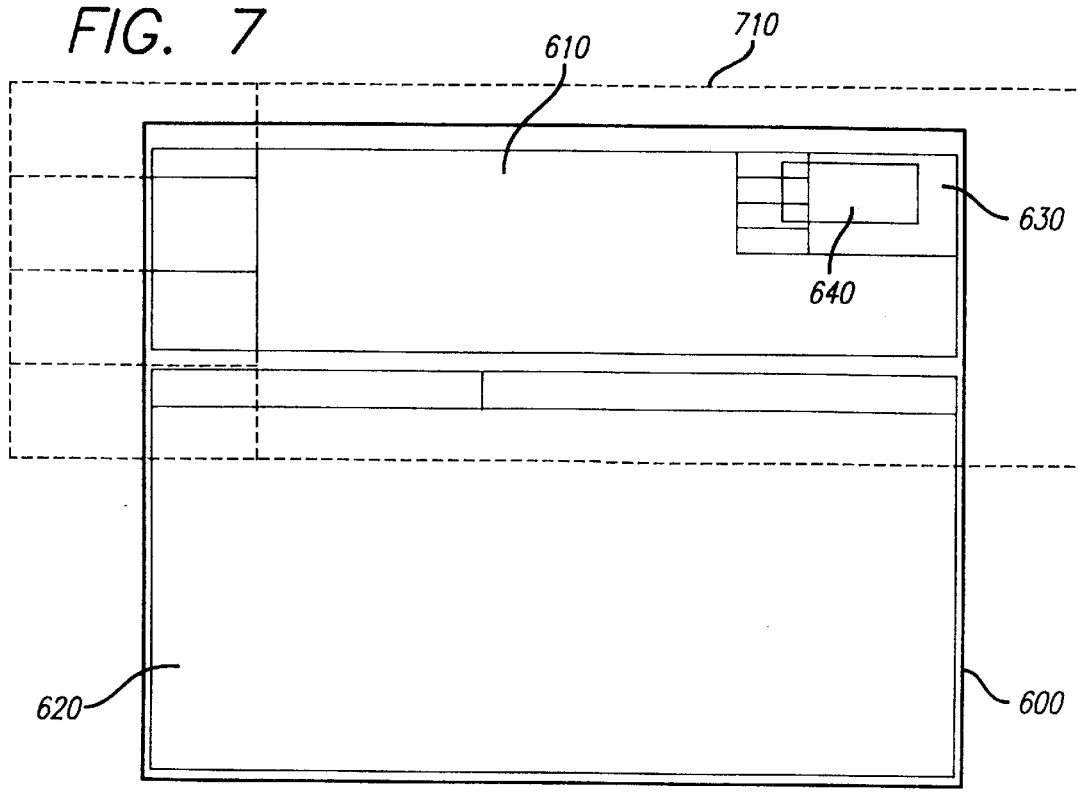
FIG. 7 is an illustration showing the relative position of the contents map window of the embodiment of FIG. 6 with respect to the contents map as a whole.
Figure 8:
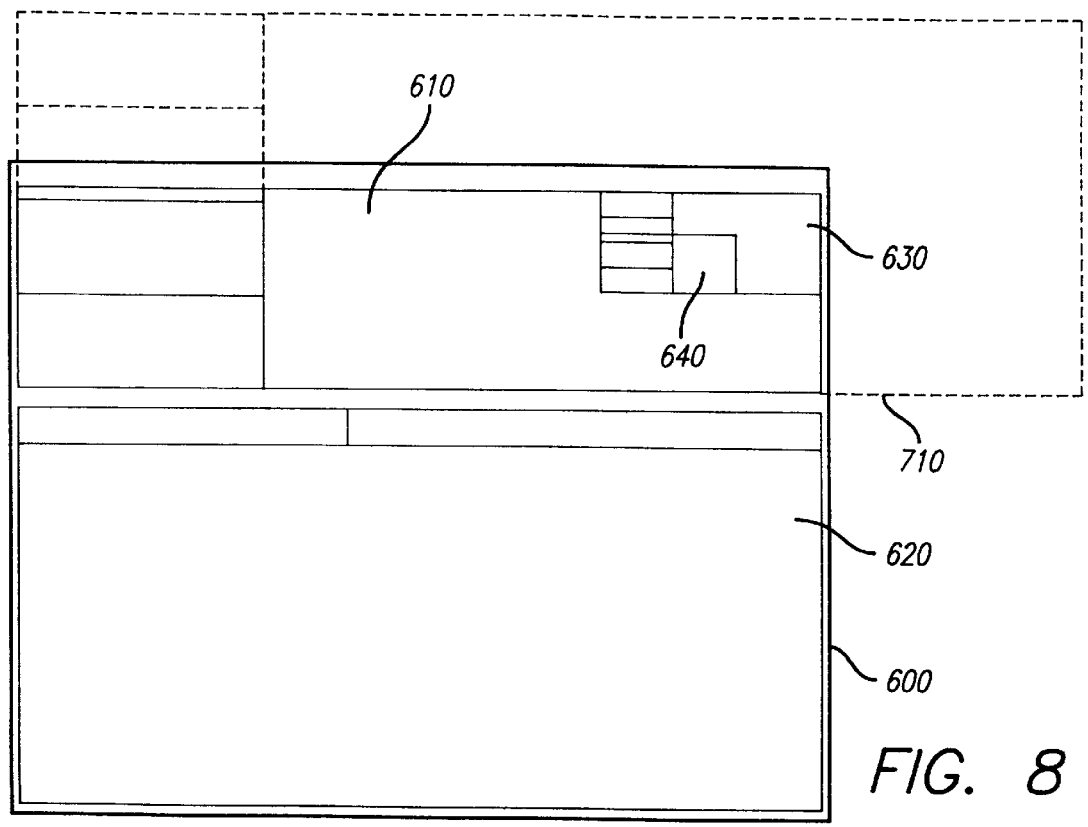
FIG. 8 is an illustration showing how the position of the contents map window relative to the contents map changes as the scrolling frame is moved in the embodiment of FIG. 7.

In the embodiment of FIG. 6, contents map window 610 shows a portion of a contents map that graphically displays the lexia of a hypermedia work. Contents map window 610 is scrolled using scrolling frame 640 of navigation window 630 using the method disclosed in U.S. Pat. No. 5,621,430 for "Method for Navigating Multiple Independent Windowed Images", which is incorporated by reference herein. As shown in FIG. 7, the relative position of scrolling frame 640 with respect to navigation window 630 is the same as the relative position of contents map window 610 with respect to the entire contents map 710, shown in outline in FIG. 7. Dragging scrolling frame 640 relative to navigation window 630, for example using a mouse, causes contents map window 610 to move with respect to contents map 710 in the same manner as scrolling frame 640 is moved relative to navigation window 630. For example, dragging scrolling frame 640 so that it is positioned at the lower left corner of navigation window 630 causes contents map window 610 to scroll so that it is positioned at the lower left corner of contents map 710. The resulting configuration is shown in FIG. 8.

Figure 9:
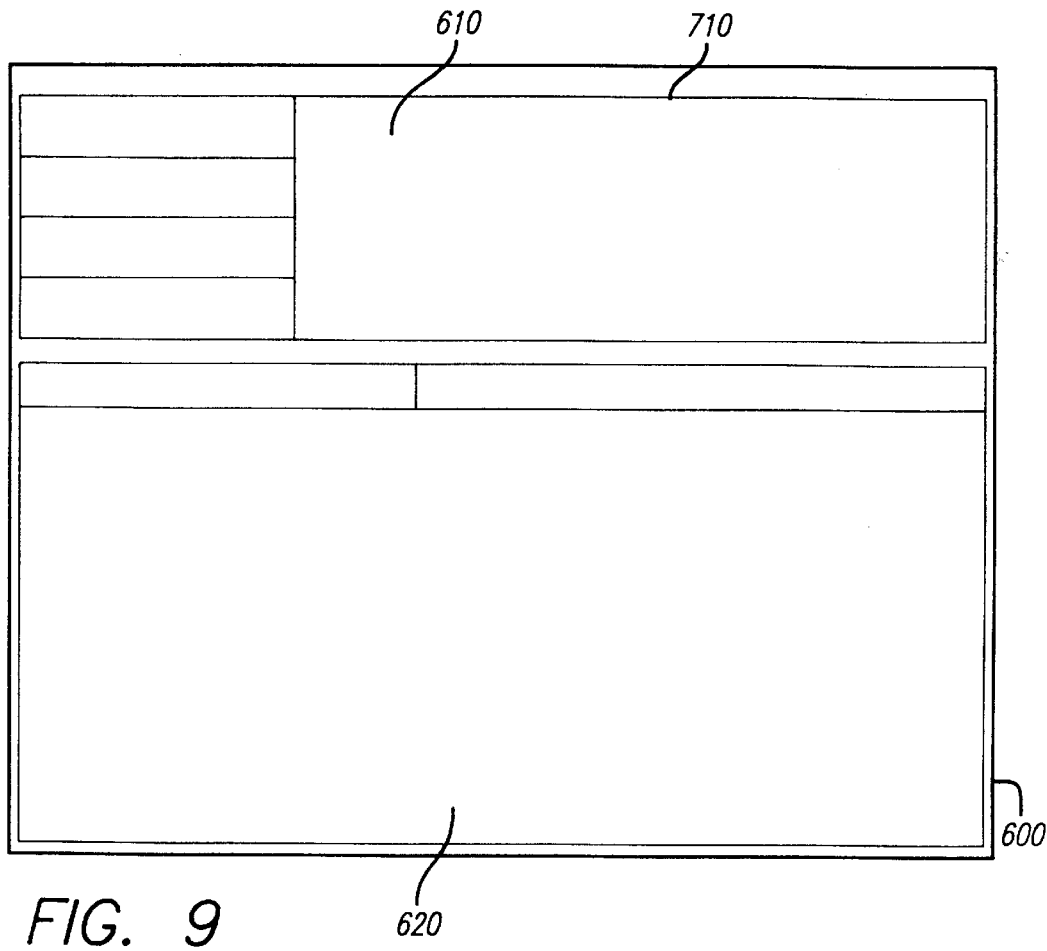
FIG. 9 is an illustration of a contents map displayed at a "Fit in Window" zoom level in one embodiment of the present invention.

In one embodiment of the present invention, the zoom level of contents map window 610 can be changed as is well known in the art such that the scale of the portion of the contents map 710 shown in contents map window 610 can be varied. In one embodiment, the zoom levels include a "Fit in Window" level in which all of contents map 710 is displayed in contents map window 610. FIG. 9 shows an embodiment in which the contents map 710 is displayed in contents map window at a "Fit in Window" zoom level. As shown in FIG. 9, if all of the contents map 710 is displayed in contents map window 610, navigation window 630 and scroll frame 640 are not displayed.

Figure 10:
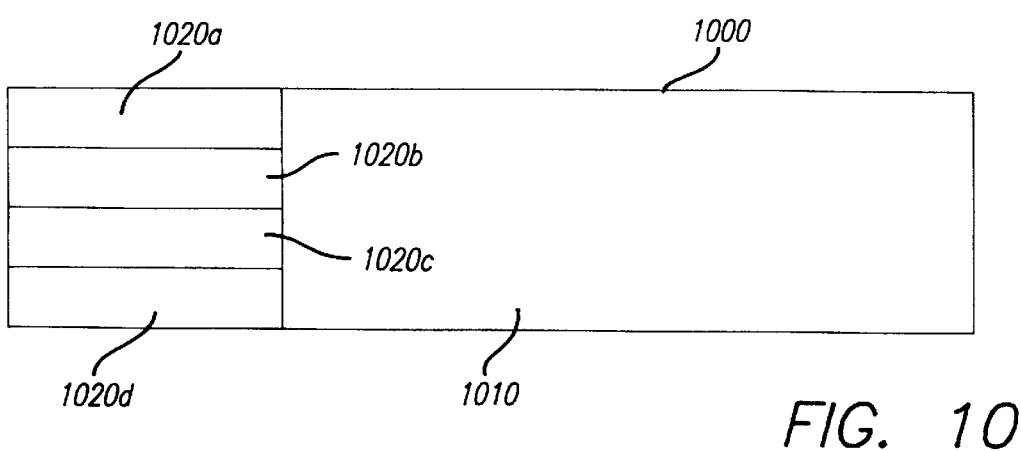
FIG. 10 is an illustration of a contents map of one embodiment of the present invention.

FIG. 10 shows a contents map 1000 of one embodiment of the present invention. Depending on the zoom level selected for contents map window 610, all or part of contents map 1000 may be displayed in contents map window 610 at one time.

Contents map 1000 of FIG. 10 displays a newly created hypermedia work that does not yet contain any lexia. At this stage, contents map 1000 consists of a background image. In the embodiment of FIG. 10, this background image consists of a single color background 1010 with different colored grid lines creating an image of boxes 1020a–1020d at the left end of contents map 1000. In other embodiments, the background image may consist of any combination of pictures, drawings, text, and any other graphic elements. The contents map may be provided with an alignment grid with a selectable "snap-to" capability to assist in the placement and alignment of graphical elements placed on the contents map.

In the embodiment of FIG. 10, boxes 1020a–1020d do not provide any functionality other than providing visually distinguishable areas on background 1010. These distinguishable areas may be used by an author for organizing lexia into different author-defined groups during the creation of a hypermedia work. In other embodiments, means other than lines and boxes (including, without limitation, other geometric shapes or distinctive colors, borders, backgrounds or designs) may be used to visually distinguish specific areas from other areas of background 1010.

Figure 11:
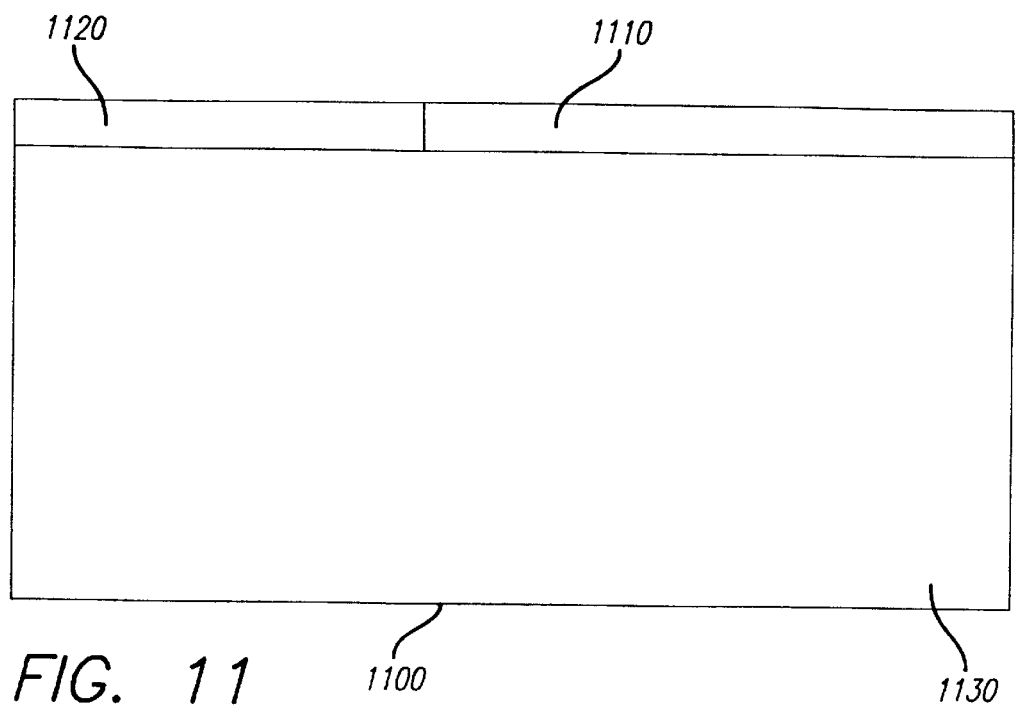
FIG. 11 is an illustration of a lexia display window of one embodiment of the present invention.

FIG. 11 illustrates a lexia display window 1100 of one embodiment of the present invention. Lexia display window 1100 is used to display the contents of a lexia when a lexia is being edited or read. In one embodiment of the invention, lexia display window 1100 provides different functionality in an editing mode than in a viewing mode.

As shown in FIG. 11, lexia display window 1100 includes a title bar 1120, a summary window 1110, and a main lexia display area 1130. Lexia display window 1100 is shown in FIG. 11 in a state in which no lexia is being displayed. If a lexia were being displayed, title bar 1120 would display the title and summary window 1110 a brief summary of the lexia being displayed. The content of the lexia would be displayed in main lexia display area 1130.

Figure 12A:
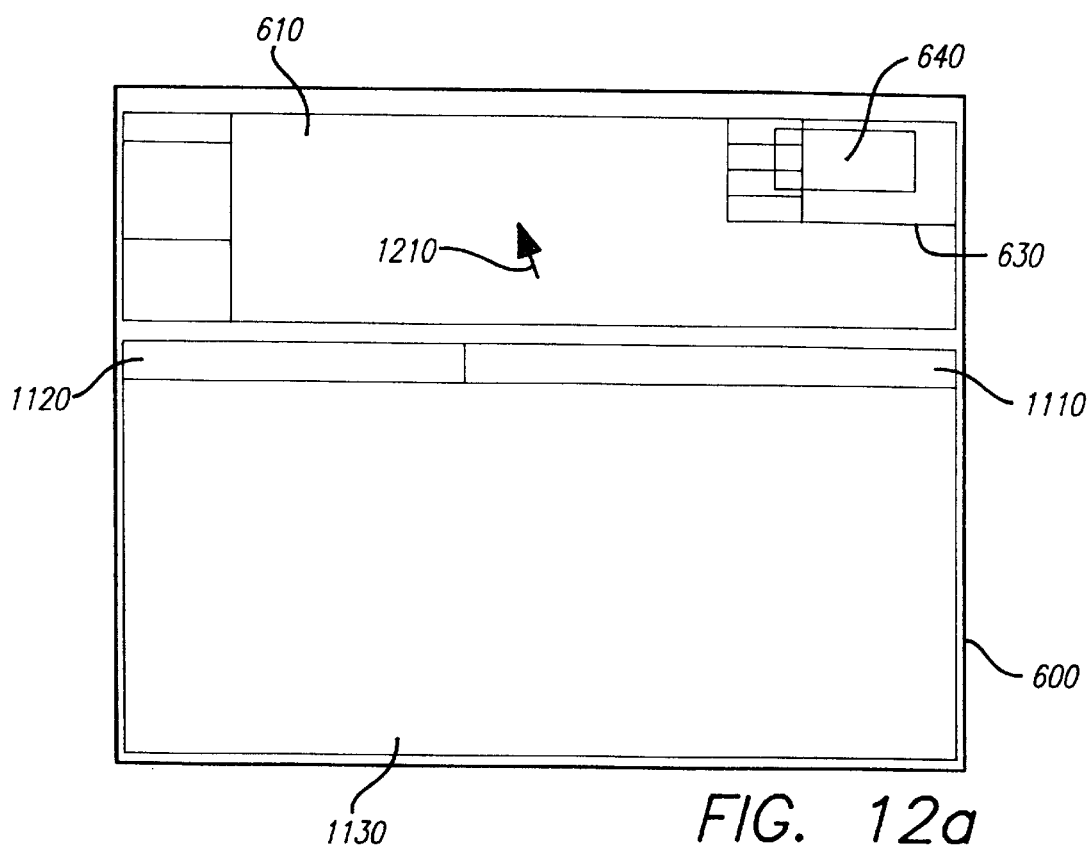
FIG. 12a is an illustration of a display screen for one embodiment of the present invention.
Figure 12B:
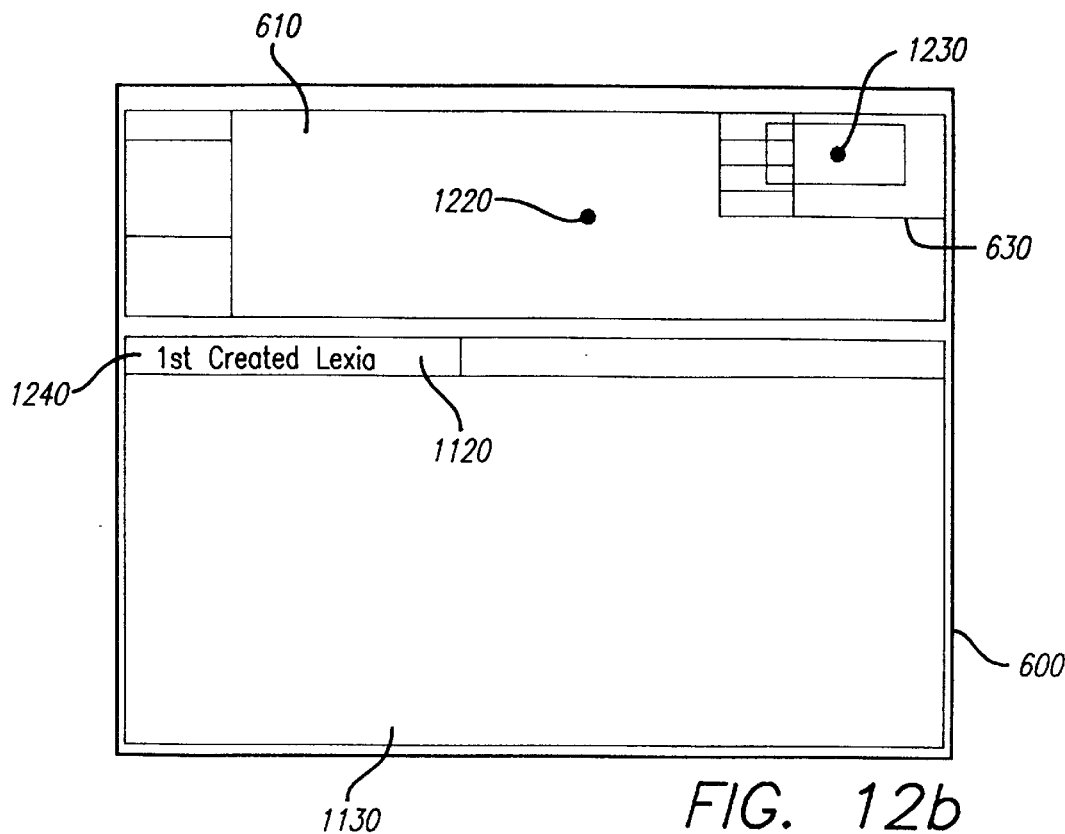
FIG. 12b is an illustration of a display screen for one embodiment of the present invention.

FIGS. 12a and 12b illustrate the creation of a new lexia in one embodiment of the present invention. As shown in FIG. 12a, in this embodiment, a new lexia may be created by moving a cursor 1210 to a desired location in contents map window 610, for example by means of a mouse, and entering an appropriate keyboard command or clicking a mouse button. In response to clicking a mouse in contents map window 610, an initially empty lexia is created as shown in FIG. 12b. Lexia symbols 1220 and 1230 representing the newly created lexia appear in contents map window 610 and navigation window 630, respectively, at the location corresponding to the position at which the mouse button was clicked. In the embodiment shown in FIG. 12b, lexia symbols 1220 and 1230 are basic symbols in the forms of dots. Dot 1230 in navigation window 630 is smaller than dot 1220 in contents map window 610. In addition, a title 1240 for the newly created lexia is displayed in title window 1120, and the contents of the newly created lexia is displayed in main lexia display area 1130. In this embodiment, a user changeable default title is initially provided for a newly created lexia. In this example, the default title is "1st Created Lexia," and the newly created lexia is empty. Accordingly, no contents is shown initially in main lexia display area 1130.

FIG. 23 is a block diagram of the process used to create a new lexia in one embodiment of the present invention. As shown in FIG. 23, at block 2310, a contents map window, a navigation window, and a lexia display window are displayed on a display screen such as a computer monitor. A notification is received at block 2315 that a user has initiated a lexia create command, for example by clicking a mouse button. The cursor position at the time the command was given is also received. Lexia symbols for a new lexia, including a lexia symbol for the contents map window and a lexia symbol for the navigation window, are generated at block 2320. These lexia symbols are displayed at positions corresponding to the cursor position received at block 2315 in the contents map window and the navigation window, respectively, at block 2325. A storage space for the new lexia is created at block 2330, and a default title, such as "2nd Created Lexia", is assigned to the new lexia at block 2335. The new lexia is displayed in the lexia display window at block 2340.

In one embodiment of the invention, lexia display window 1100 has an edit mode and a viewing mode. When the edit mode is active, a number of word processing tools, as are well known in the art including text, graphics, table, and spreadsheet tools are available for entering contents into the currently displayed lexia.

Figure 12C:
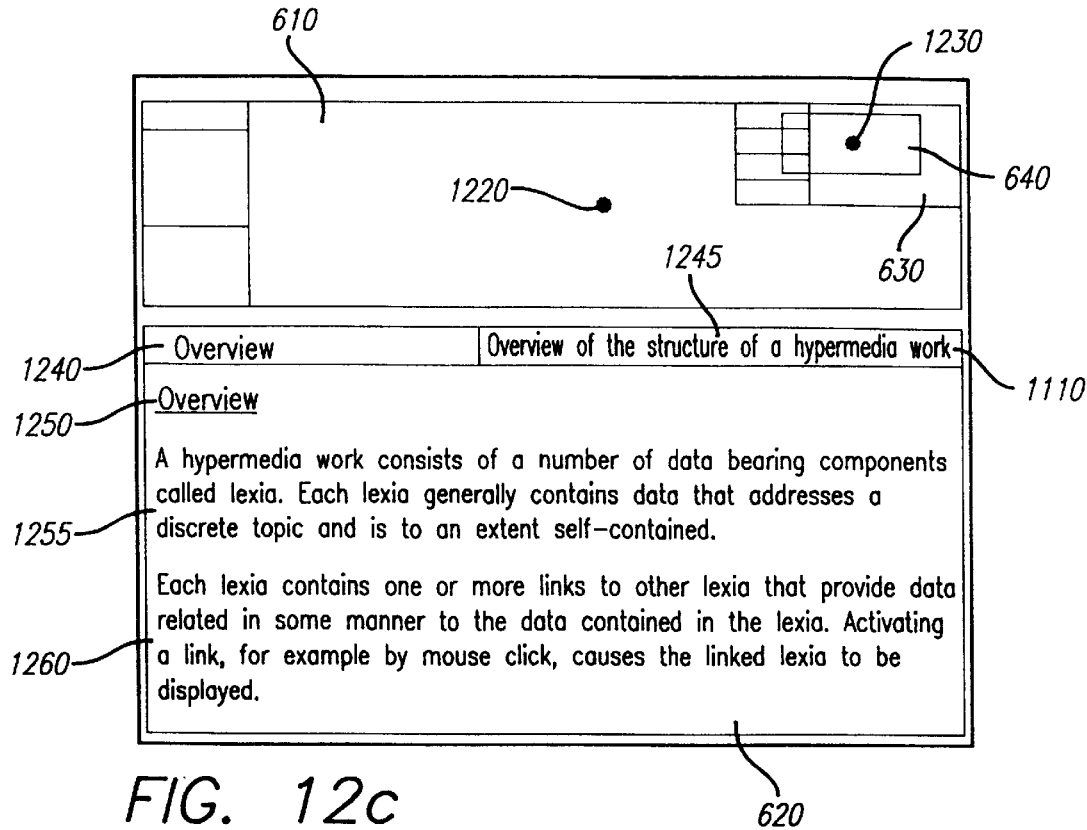
FIG. 12c is an illustration of a display screen for one embodiment of the present invention.

FIG. 12c shows the newly created lexia of FIG. 12b after the title has been changed from its default title and after text has been added to main lexia display area 1130. In addition, a summary 1245 has been added to summary window 1110. As shown in FIG. 12c, the contents of the lexia, as shown in main lexia display area 1130, now includes a heading 1250 and two paragraphs of text 1255 and 1260, respectively.

In one embodiment of the invention, title 1240 and summary 1245, although they are part of the underlying lexia, are not visible when lexia display window 1100 is in a viewing mode. A lexia may contain additional data fields that are part of the lexia that are accessible in the edit mode and not in the viewing mode of display window 1100. For example, there may be a "nickname" field for a nickname that may be given to a lexia by the author, or an index field that contains a number or other index, or a keyword field that contains keywords for the lexia.

Figure 12D:
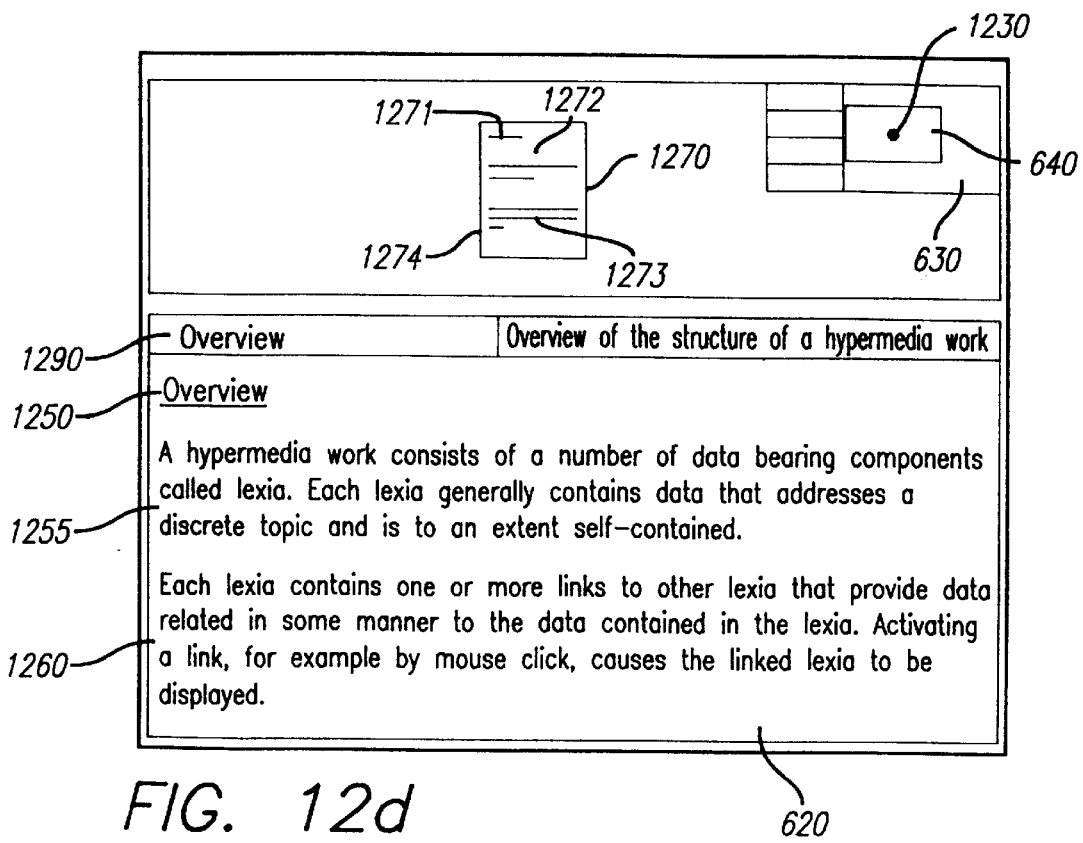
FIG. 12d is an illustration of a display screen for one embodiment of the present invention showing a caricature symbol.

In one embodiment of the invention, contents map window 610 can be displayed in different modes as well as in different zoom levels. Different modes display different types of lexia symbols to represent lexia in contents map window 610. For example, for the mode shown in FIGS. 12b and 12c, the type of lexia symbol displayed for a lexia is a simple symbol such as dot A different display mode for contents map window 610 is shown in FIG. 12d. In FIG. 12d, contents map window 610 also is shown at a greater zoom level than in FIGS. 12b and 12c. Contents map window 610 thus shows a smaller portion of the whole contents map than in FIGS. 12b and 12c. Accordingly, in FIG. 12d, scrolling frame 640, which corresponds to the portion of the contents map displayed in contents map window 610, comprises a smaller portion of navigation window 630 than in FIGS. 12b and 12c.

For the display mode of contents map window 610 of FIG. 12d, the lexia symbols used to represent lexia are information rich, dynamic lexia symbols with enhanced mnemonic features and visual cues called "caricatures". The mnemonic features and visual cues of a caricature, together with its position with respect to other elements in the contents map, provide means for uniquely visually identifying the underlying lexia.

The visual cues of a caricature identify distinguishing features of the underlying lexia. A caricature is not a static, predefined symbol, but is constructed dynamically based on the content and history of the underlying lexia. A caricature, as its name implies, is not generally an exact, miniature replica of the underlying lexia. Instead, it is a separate graphical image that is constructed so as to exaggerate certain distinguishing aspects as, for example, distinctive features of the visual appearance of the underlying lexia. As such, the caricature becomes both a distinctive symbol for the lexia and a representation that aids an author and/or a reader in associating lexia content with a particular caricature, and helps an author and/or reader remember this association during subsequent navigation through a hypermedia work. In one embodiment, the appearance of a caricature is periodically refreshed to reflect changes that may have occurred in the underlying lexia. In one embodiment, the appearance of a caricature is refreshed after each change that is made to an underlying lexia. In one embodiment, the appearance of a caricature for a lexia is frozen upon expiration of a predetermined time limit or upon user command.

In FIG. 12d, caricature 1270 represents "Overview" lexia 1290 displayed in lexia display window 620. As shown in FIG. 12d, Overview lexia 1290 is a text lexia. Overview lexia 1290 contains a heading 1250 and two paragraphs of text 1255 and 1260, respectively. Paragraph 1255 contains two full lines and one partial line approximately two-thirds of a full line in length. Paragraph 1260 contains three full lines of text and a partial fourth line containing a single word. Visual distinguishing features of Overview lexia 1290 are a short heading, a relatively short first paragraph whose last line is two-thirds of a full line in length, and a second paragraph somewhat longer than the first paragraph whose last line is a single word.

Figure 13A:
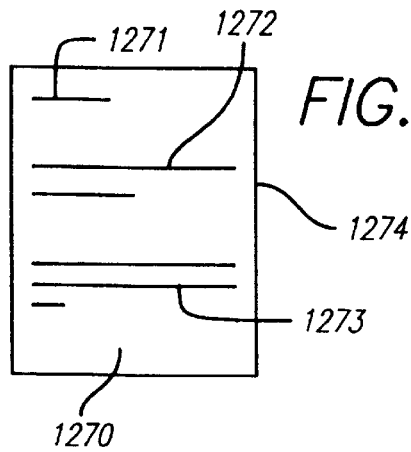
FIG. 13a is an illustration of one embodiment of a caricature symbol.

In the embodiment of FIG. 12d, caricature 1270 consists of a stylized image of a page of text, reflecting the fact that the underlying lexia is a text lexia. As shown in greater detail in FIG. 13a, caricature 1270 consists of a rectangle 1274 inside of which are lines representing paragraphs of text. Specifically, caricature 1270 includes a short bold line 1271; a first paragraph 1272 consisting of two lines, one of which full length and the other approximately two-thirds of a full length; and a second paragraph 1273 consisting of three lines, two of which are full length and one of which is a short stub. Short bold line 1271 of caricature 1270 represents underlined heading 1250 of Overview lexia 1290. First paragraph 1272 of caricature 1270 represents first paragraph 1255 of Overview lexia 1290. Second paragraph 1273 of caricature 1270 represents second paragraph 1260 of Overview lexia 1290. Although paragraphs 1272 and 1273 of caricature 1270 contain two and three horizontal straight lines, respectively, while paragraphs 1255 and 1260 of underlying Overview lexia 1290 contain three and four actual lines of text, respectively, the relative shapes and sizes of paragraphs 1272 and 1273 of caricature 1290 are visually generally the same as the relative shapes and sizes of paragraphs 1255 and 1260 of Overview lexia 1290. Thus although caricature 1270 is not an exact replica of Overview lexia 1290, the relative shapes and sizes of its visual features associate caricature 1270 visually with Overview lexia 1290. Further, the relative shapes and sizes of its visual features distinguish caricature 1270 from caricatures representing lexia having different paragraph forms.

Figure 13B:
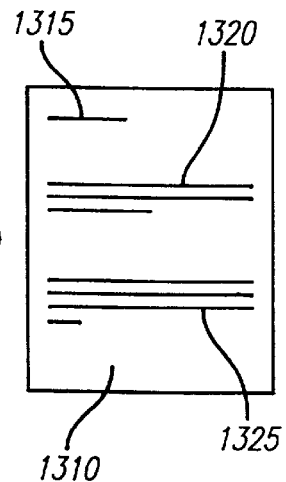
FIG. 13b is an illustration of a second embodiment of a caricature symbol.
Figure 13C:
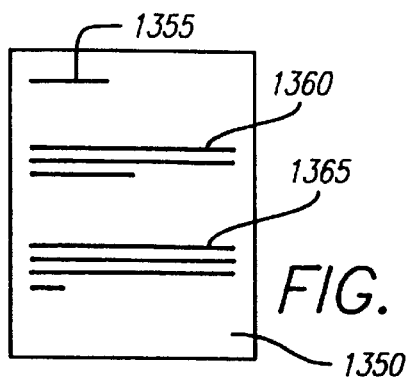
FIG. 13c is an illustration of a third embodiment of a caricature symbol.

FIGS. 13b and 13c illustrate other embodiments of caricatures for Overview lexia 1290. However, it will be understood that the caricatures of the present invention are not limited to the specific caricatures shown. In addition to the example caricatures of FIGS. 13a, 13b, and 13c, a wide variety of other caricatures that visually distinguish one lexia from another by emphasizing distinctive features can be used.

In caricature 1310 of FIG. 13b, a separate straight line is used to represent each line of text in the underlying lexia 1290. Each full length straight line in caricature 1310 represents a full line of text in the underlying lexia and each partial length straight line in caricature 1310 represents a partial line in the underlying lexia. Caricature 1310 consists of bold line 1315 representing heading 1250 of lexia 1290, first paragraph 1320 consisting of two full length straight lines and one partial length straight line representing first paragraph 1255 of lexia 1290, and second paragraph 1325 consisting of three full length straight lines and one partial length straight line representing second paragraph 1260 of lexia 1290.

In caricature 1350 of FIG. 13c, solid blocks 1355, 1360, and 1365 represent heading 1250 and paragraphs 1255 and 1260, respectively, of lexia 1290. The shapes of blocks 1355, 1360 and 1365 correspond to the general relative shapes of the corresponding blocks of text of the underlying lexia.

Figure 14:
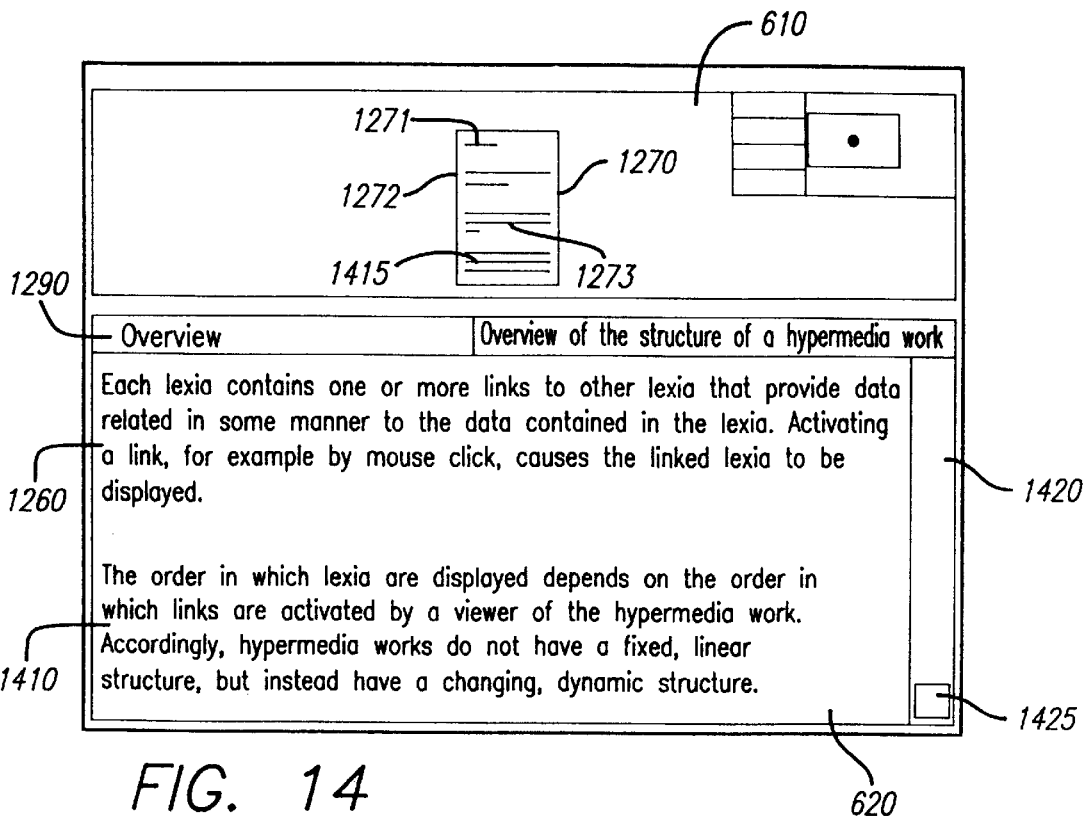
FIG. 14 is an illustration of a display screen for one embodiment of the present invention showing dynamic features of a caricature.

FIG. 14 illustrates how the appearance of a caricature of the present invention dynamically changes to reflect changes to the underlying lexia represented by the caricature. FIG. 14 shows the display screen of the embodiment of FIG. 12d after a new paragraph 1410 has been added to Overview lexia 1290. New paragraph 1410 may be added, for example, by typing in the new text using the word processing tools in the editing mode of lexia display window 620. In the embodiment of FIG. 14, addition of paragraph 1410 has made the text area of lexia 1290 larger than lexia display window 620. Accordingly, a scroll bar 1420 and a scroll button 1425 have been added to lexia display window 620 to allow the scrolling of the portion of lexia 1290 displayed in lexia display window 620.

In the embodiment shown in FIG. 14, new paragraph 1410 contains the same number of lines as existing paragraph 1260, all of which are essentially full-width. As shown in FIG. 14, addition of paragraph 1410 to lexia 1290 causes a corresponding paragraph representation 1415 to be added to caricature 1270 displayed in contents map window 610. Because new paragraph 1410 has the same number of lines as existing paragraph 1260, paragraph representation 1415 corresponding to paragraph 1410 has the same number of straight lines, three, as paragraph representation 1273 corresponding to paragraph 1260. Because the text lines of new paragraph 1410 are essentially full-width lines, the lines of paragraph representation 1415 of caricature 1270 are also full width.

Figure 15A:
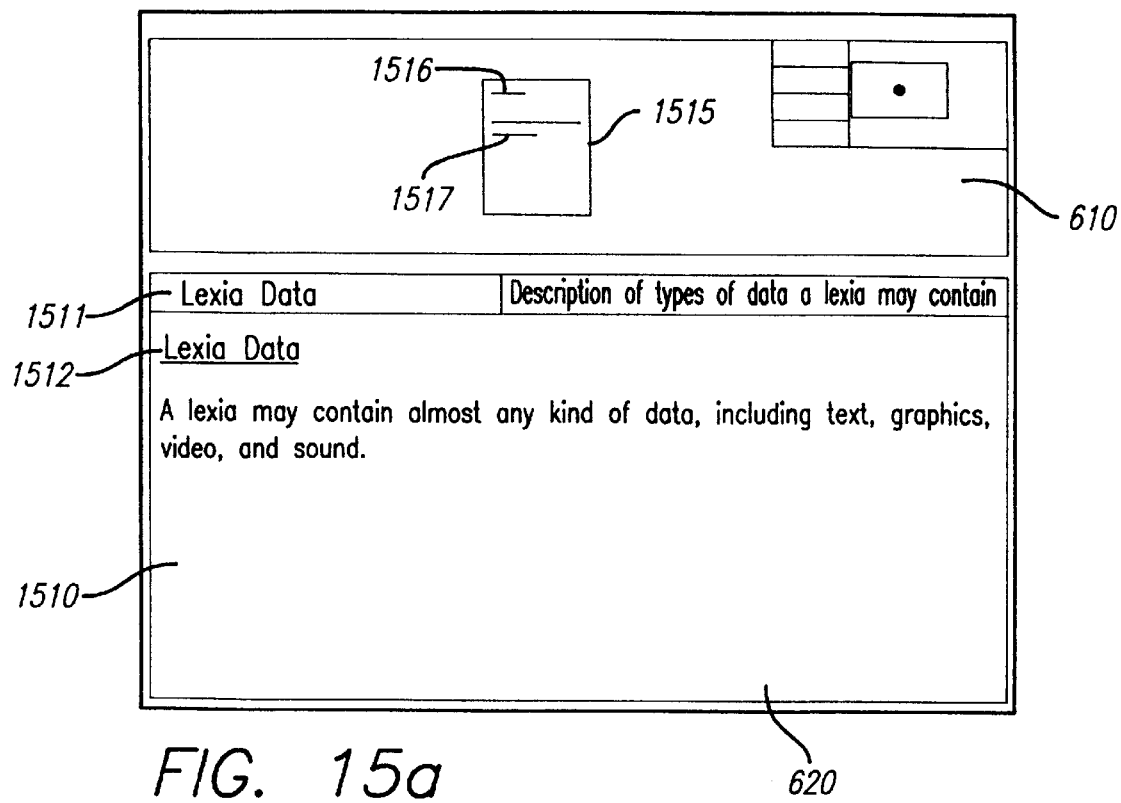
FIG. 15a is an illustration of a display screen for one embodiment of the present invention showing a lexia and a corresponding caricature symbol.
Figure 15B:
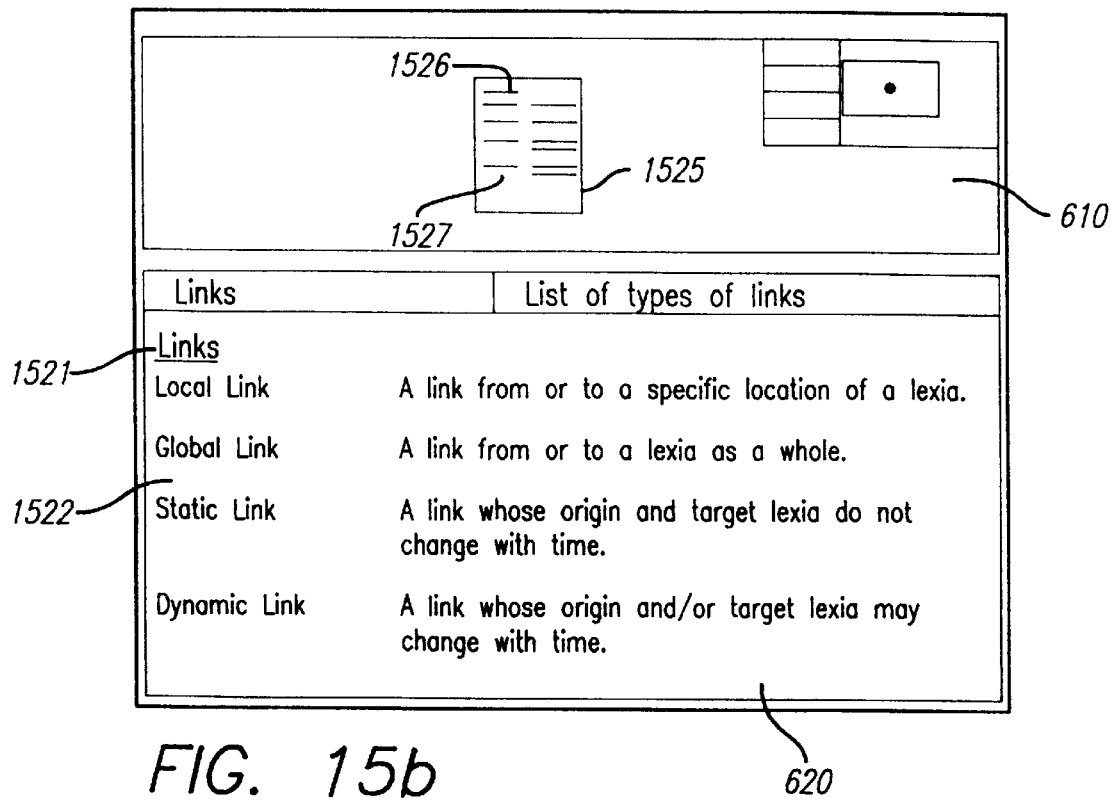
FIG. 15b is an illustration of a display screen for one embodiment of the present invention showing a lexia and a corresponding caricature symbol.

FIGS. 15a and 15b show two other examples of lexia and corresponding caricatures.

FIG. 15a shows a lexia 1510 called "Lexia Data" in lexia display window 620 consisting of a heading 1511 and a two-line paragraph 1512. The corresponding caricature 1515 displayed in contents map window 610 features a short bold line 1516 representing heading 1511 and a paragraph representation 1517 corresponding to paragraph 1512 consisting of a full width straight line and a short straight line.

FIG. 15b shows a lexia called "Links" in lexia display window 620 consisting of a heading 1521 and a two-column, four entry table 1522. The corresponding caricature 1525 displayed in contents map window 610 features a short bold line 1526 representing heading 1521 and a table representation 1527 for table 1522 consisting two columns of straight lines corresponding to the structure of the text in table 1522.

In the embodiments of caricatures shown in FIGS. 14, 15a and 15b, the aspect ratios of the paragraph and table representations used in the caricatures are similar to the aspect ratios of the actual paragraphs and tables in the underlying lexia. However, it is not necessary to maintain the same aspect ratios in a caricature as in the underlying lexia. Also, it is not necessary to have the same number of paragraph representations in a caricature as there are paragraphs in the underlying lexia. If the lexia contains a table, it is not necessary for a table representation used in the corresponding caricature to contain the same number of columns and/or rows as the original table.

The caricatures of the present invention can be used to improve recognition of the underlying lexia by exaggerating visual features that a person typically uses to distinguish one item from another and by minimizing those features that a person tends to ignore. For purposes of distinguishing one caricature from another and for associating a caricature with the content of the underlying lexia, the existence of a table, or the fact that a paragraph or heading is centered, may be more important than the configuration of the table or the length of the paragraph or heading. Similarly, for a very long lexia, the appearance of the first portion of the lexia may be sufficient to distinguish the lexia from other lexia. Accordingly, only a representation for the first portion of the lexia need be displayed in the caricature. For example, for a lexia containing ten paragraphs, it may be sufficient to display representations of only the first four paragraphs in the corresponding caricature. Thus, by appropriately choosing the criteria used for creating caricatures, the vertical dimension of a caricature, if desired, can be compressed significantly compared to the vertical dimension of the underlying lexia. A vertically long lexia can then be represented by a relatively shorter caricature.

FIGS. 16a–16d illustrate embodiments of caricatures of the present invention that provide information about characteristics of the underlying lexia other than information about the contents or visual appearance of the lexia.

Figure 16A:
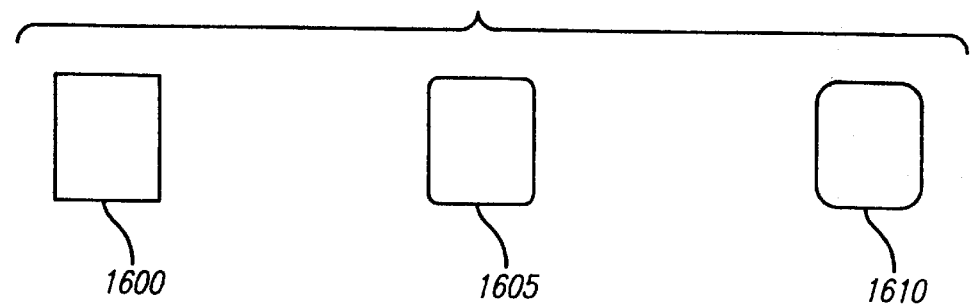
FIG. 16a is an illustration of caricatures of one embodiment of the present invention.

FIG. 16a illustrates embodiments of caricatures of the present invention 1600, 1605 and 1610 in which the degree to which the corners of each caricature are rounded corresponds to the number of times that the lexia represented by a caricature has been selected by an author during editing or by a viewer during viewing. The rounding of corners of caricatures is a metaphor for the tendency of paper documents to become dog-eared the more they are handled.

In FIG. 16a, caricature 1600 has sharp corners, caricature 1605 has slightly rounded corners, and caricature 1610 has more rounded corners, indicating that of these three caricatures, the lexia represented by caricature 1610 has been selected the most number of times and the lexia represented by caricature 1600 the least. It will be apparent to those skilled in the art that the degree of rounding of corners may signify some characteristic other than the relative number of times a lexia represented by a caricature has been selected, that the rounding can be applied to less than all corners of a caricature, and that other aspects of a caricature can be changed to indicate the relative number of times the lexia represented by a caricature has been selected.

Figure 16B:
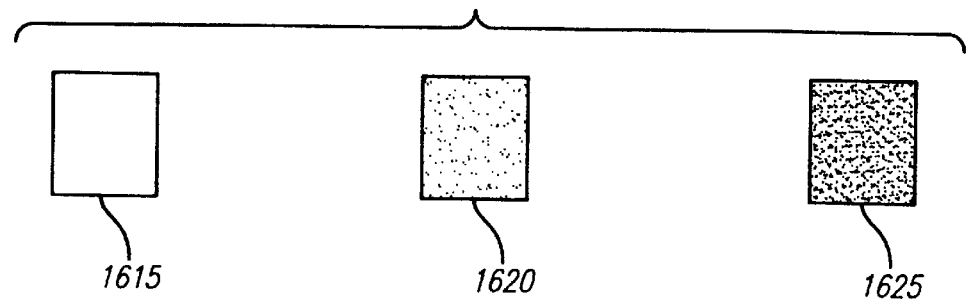
FIG. 16b is an illustration of caricatures of one embodiment of the present invention.

FIG. 16b illustrates embodiments of caricatures of the present invention 1615, 1620 and 1625 in which coloring of the background of a caricature represents information about the caricature. In one embodiment, the background color of a caricature varies from white to successively darker shades of gray. In this embodiment, the shade of the background color of a caricature corresponds to the relative length of time since the last time the lexia represented by a caricature was selected. This progressive shading with time is a metaphor for the tendency for paper documents to become faded and yellowed over time.

In FIG. 16b, the background color of caricature 1615 is a lighter shade than the background color of caricature 1620, which is turn is a lighter shade than the background color of caricature 1625. Accordingly, the lexia represented by caricature 1615 is the most recently selected lexia of the lexia represented by caricatures 1615, 1620 and 1625, and the lexia represented by caricature 1625 is the least recently selected. It will be apparent to those skilled in the art that the relative length of time since the lexia represented by a caricature has been selected may be indicated on a caricature by some other means, that different color and shading schemes can be used, and that the variation in color of caricatures may indicate information other than the relative time since the lexia represented by a caricature has been selected. For example, in one embodiment, the variation of color over time represents the time since the lexia was created instead of the time since the lexia was last selected.

Figure 16C:
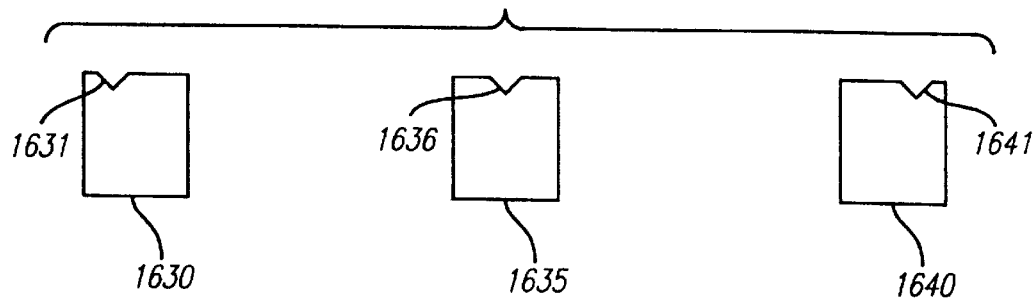
FIG. 16c is an illustration of caricatures of one embodiment of the present invention.

FIG. 16c illustrates embodiments of caricatures of the present invention 1630, 1635 and 1640 in which the location of a notch along the top edge of a caricature is used to provide a distinguishing feature for a caricature. The notch is a metaphor for pages being torn from a pad. In one embodiment, the location of the notch indicates a relative time at which the lexia represented by a caricature was created. In another embodiment, the notch is a random or pseudo random feature whose position is not based on any feature of the underlying lexia but that is added to a caricature to help distinguish the caricature from other caricatures. In one embodiment, instead of a single notch being placed at a random location, different numbers of notches are placed in different locations to provide a randomized distinctive appearance. For example, one caricature may have a single notch near the center of its top edge, while another may have one notch to the left and two notches to the right of the center of the top edge. It will be apparent to those skilled in the art that other features other than the location and number of notches can be used to add distinctive random features to a caricature.

In the embodiment of FIG. 16c, the nearer a notch is to the top left corner of a caricature, the earlier a lexia represented by a caricature was created. Of caricatures 1630, 1635, and 1640 in FIG. 16c, caricature 1630 has a notch 1631 closest to the caricatures top left corner. Accordingly, the lexia represented by caricature 1630 was created earlier than the lexia represented by caricatures 1635 and 1640. Caricature 1640 has a notch 1641 furthest from its top left corner. Accordingly, the lexia represented by caricature 1640 was created later than the lexia represented by caricatures 1635 and 1640. It will be apparent to those skilled in the art that the relative time at which a lexia is created can be represented by other means than the position of a notch along the top edge of the caricature representing the lexia, that a notch may be located on other edges than a top edge of a caricature, that indications other than a notch can be used, and that the position of a notch along an edge of a caricature can provide other information than the relative time at which the lexia represented by a caricature was created.

Figure 16D:
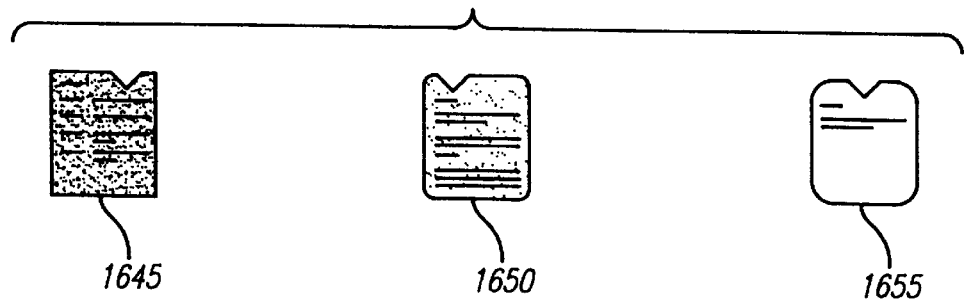
FIG. 16d is an illustration of caricatures of one embodiment of the present invention.

FIG. 16d shows embodiments of caricatures of the present invention incorporating features of the caricatures of FIGS. 14, 15a–b, and 16a–c.

Of the three caricatures 1645, 1650 and 1655 of FIG. 16d, caricature 1645 has the sharpest corners, the darkest shading, and a notch furthest from its top left corner. Accordingly, relative to the three lexia represented by caricatures 1645, 1650 and 1655, the lexia represented by caricature 1645 has been selected the least, was last selected a longer time ago, and was the last created. Caricature 1645 also indicates that the underlying lexia contains a table with four entries.

Caricature 1655 has the lightest shade of color, the most rounded corners, and a notch along the top edge closer to the top left corner than caricature 1645 but further from the top left corner than caricature 1650. Accordingly, the lexia represented by caricature 1645 was selected more recently than the lexia represented by caricatures 1645 and 1655, has been selected more often than the other two lexia, and was created after the lexia represented by caricature 1650 but before the lexia represented by caricature 1645. Caricature 1655 also indicates that the underlying lexia contains a heading and a single short paragraph.

It will be apparent to those skilled in the art that other aspects of the visual appearance of a caricature can be used to provide information about the underlying lexia. Such other aspects can include, without limitation, the size and/or aspect ratio of a caricature, the caricature's color scheme, designs, text and graphics that are included in a caricature, animation exhibited by a caricature, and other visual features.

FIG. 24 is a block diagram of the process used to display a caricature in one embodiment of the present invention. As shown in FIG. 24, when a new lexia is created, a default caricature, such as a empty rectangle with sharp corners, is generated at block 2405. At block 2406, a randomized appearance feature, such as a notch along a randomized location at the top edge of the caricature, is generated at block 2406 and added to the caricature. A lexia selection counter that counts the number of times the lexia represented by the caricature has been selected is initialized to zero at block 2408, and the caricature is displayed in the contents map window at block 2410. The lexia selection counter is incremented by one at block 2412, and the appearance of the caricature is conformed to the lexia selection counter value at block 2414. The appearance of the caricature changes at certain predetermined values of the lexia selection counter, for example in the manner described above with respect to the embodiment of FIG. 16a. For a new lexia for which the lexia selection counter is at an initial value of 1, no change in appearance of the caricature is required.

At block 2416, the caricature is highlighted in the contents map window reflecting that the lexia corresponding to the caricature is the currently selected lexia. At block 2418, a determination is made as to whether the lexia represented by the caricature is still selected. If the lexia is still selected, a determination is made at block 2420 as to whether any changes have been committed to the lexia, for example by typing in text in the lexia display window and executing a "save" command. If no changes have been committed, the process returns to block 2418.

If changes have been committed, the appearance of the caricature is conformed to the changes to the lexia at block 2422, and the process returns to block 2418.

If it is determined that the lexia represented by the caricature is no longer selected at block 2418, the highlighting of the caricature in the contents map window is removed at block 2424 and a not selected timer is started at block 2426. The not selected timer keeps track of the amount of time that has passed since the last time the lexia represented by the caricature was selected. The next selection of the lexia is awaited at block 2428.

At block 2430 a determination is made as to whether the lexia has been selected. If the lexia has not been selected, a determination is made at block 2436 as to whether the timer increment that triggers a change in the appearance of the caricature has been reached. If that time increment has not been reached, the process returns to block 2428. If the time increment has been reached, the appearance of the caricature is conformed to the value of the not selected timer at block 2438. For example, the color of the caricature may be changed in the manner described above with respect to the embodiment of FIG. 16b. The process then returns to block 2428.

If it is determined at block 2430 that the lexia has been selected, the not selected timer is reset to zero at block 2432 and the appearance of the caricature is conformed to a not selected timer value of zero at block 2434. The process then returns to block 2412.

FIG. 25 is a block diagram of the process used to conform a caricature to changes to the underlying lexia in one embodiment of the present invention. As shown in FIG. 25, the contents of the lexia is examined at block 2510 and the distinguishing features, such as headings, paragraphs, tables, graphic frames, etc., are identified at block 2520. Representations for the identified distinguishing features are generated at 2530, and, in the embodiment of FIG. 25, the representations are sized to fit the caricature at block 2540.

In one embodiment, instead of sizing the representations for the content of the underlying lexia to fit the caricature as in the embodiment of FIG. 25, the representations are "clipped" so that only the portions of the representations that fit into a caricature are included in the caricature. For example, if a lexia contains ten paragraphs for which there are ten paragraph representations, but the caricature and paragraph representations are sized such that only the first three and a half of the ten paragraph representations fit into the caricature, then only those first three and a half paragraph representations are included in the caricature. In one embodiment, if the representations for the content of a lexia generated using one method result in representations of which only a portion fit a caricature, representations are generated using a different method to attempt to generate representations a greater portion of which will fit a caricature.

Figure 17A:
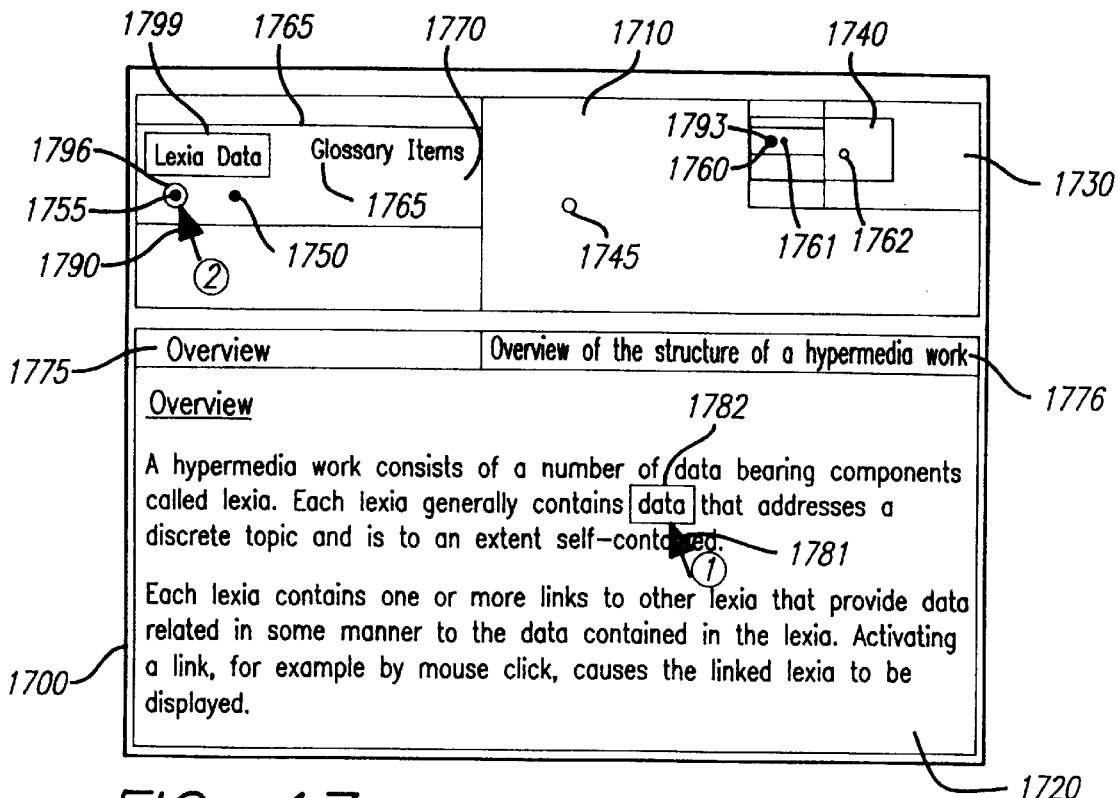
FIG. 17a is an illustration of a display screen showing how the contents map window can be used to organize and create links between lexia in one embodiment of the present invention.
Figure 17B:
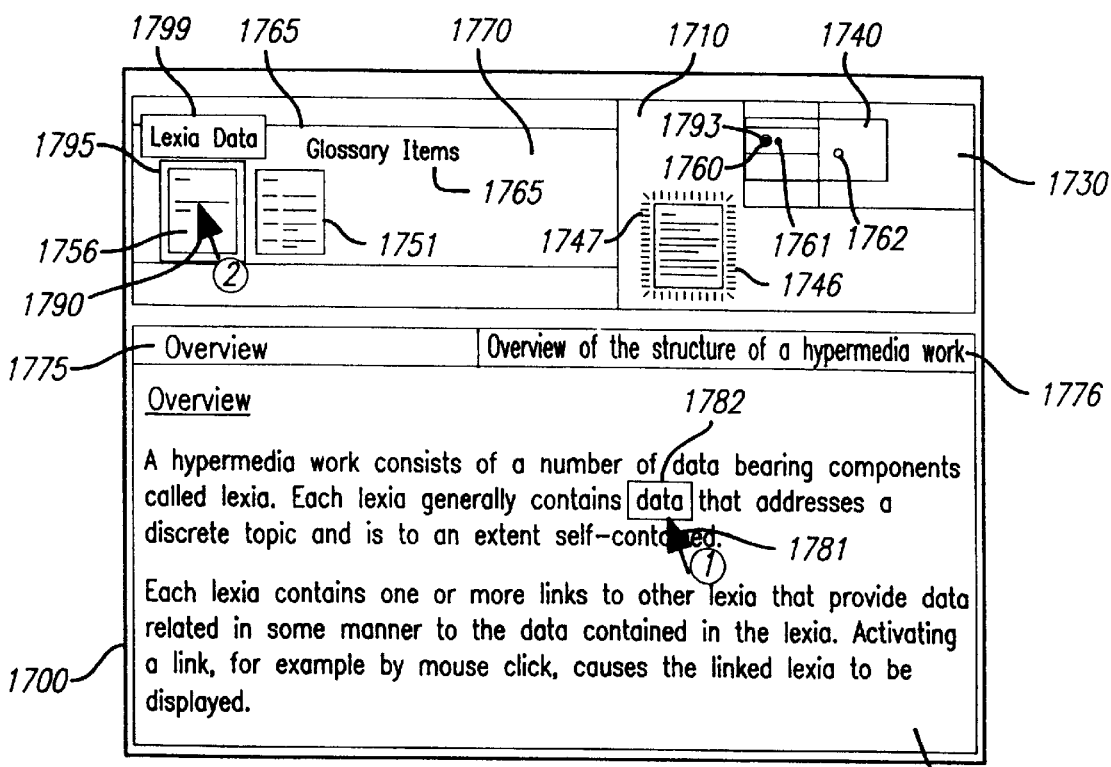
FIG. 17b is an illustration of a display screen showing how the contents map window can be used to organize and create links between lexia in one embodiment of the present invention.

FIGS. 17a and 17b show one way in which the contents map window of the present invention can be used by an author of a hypermedia work to organize and create links between lexia in one embodiment of the present invention. FIG. 17a shows an embodiment of a display screen in which the display mode for the contents map window is the same as in FIG. 12c. In this display mode, lexia are represented by colored dots. FIG. 17b shows an embodiment of a display screen in which the display mode for the contents map window is the same as in FIG. 12d. In this display mode, the lexia symbols used to represent lexia are caricatures.

The display screens 1700 shown in FIGS. 17a and 17b both include a contents map window 1710, a lexia display window 1720, a navigation window 1730, and a scrolling frame 1740. Contents map window 1710 contains lexia symbols representing three lexia. In FIG. 17a, the lexia symbols used to represent the three lexia are colored dots 1745, 1750 and 1755, respectively. In FIG. 17b, the lexia symbols used to represent the three lexia are caricatures 1746, 1751, and 1756, respectively. In both FIGS. 17a and 17b, the three lexia are represented in navigation window 1730 by small colored dots 1760, 1761, and 1762 respectively.

The portions of the contents map shown in contents map window 1710 of FIGS. 17a and 17b contain grid lines 1765 that form a box 1770 in contents map window 1710. Box 1770 has no function other than providing a visually separate area in the contents map that can be used by the author to organize lexia. In FIG. 17a, dots 1750 and 1755, representing two lexia, have been placed by the author of in box 1770. Similarly, in FIG. 17b, caricatures 1751 and 1756 have been placed by the author in box 1770.

The embodiments of FIGS. 17a and 17b allow an author and a viewer to create freely movable floating text labels that can be positioned anywhere on the contents map. These floating text labels allow an author or viewer to place text that is useful to the author or viewer adjacent to individual lexia symbols or groups of lexia symbols to aid the author in organizing and authoring and the viewer in viewing and understanding the hypermedia work. In one embodiment of the invention, an author can choose whether or not a floating text label created by the author is made visible to a viewer of the created hypermedia work.

In FIGS. 17a and 17b, a floating text label 1766 containing the text "glossary Items" has been placed by the author in box 1770. Floating text label 1766 signals to the author or the viewer that the lexia symbols located in box 1770 are considered by the author to be "glossary items." What is meant by "glossary items" is solely at the discretion of the author. In the embodiment of FIGS. 17a and 17b, placing lexia symbols in box 1770 or grouping lexia symbols in any other manner on the contents map does not imply or create any links or any other structural relationship between the lexia represented by the lexia symbols.

In the embodiments of FIGS. 17a and 17b, the contents of a currently selected lexia is displayed in lexia display window 1720. In the example of FIGS. 17a and 17b, the name of the currently selected lexia, "Overview", is displayed in title bar 1775, and a summary description is displayed in summary window 1776.

The currently selected lexia is also identified in contents map 1710 and navigation window 1730 by highlighting the lexia symbol representing the selected lexia.

In the embodiment of FIG. 17a, lexia symbol 1745 representing the selected lexia in contents map window 1710 is highlighted by changing its color from its normal color to a highlighted color. In FIG. 17a highlighting of lexia symbol 1745 is indicated by representing lexia symbol 1745 by a white dot.

In the embodiment of FIG. 17b, caricature 1746 representing the selected lexia in contents map window 1710 is highlighted by changing its color from its normal color to a highlighted color. In FIG. 17a highlighting of caricature 1746 is indicated by short lines 1747 extending radially from caricature 1746.

In FIGS. 17a and 17b, lexia symbol 1762 representing the selected lexia in navigation window 1730 is highlighted by changing its color from its normal color. In FIGS. 17a and 17b highlighting of lexia symbol 1762 is indicated by representing lexia symbol 1762 by a white dot.

As will be apparent to those skilled in the art, any of a variety of other means can be used to highlight the lexia symbols of a selected lexia to identify a selected lexia.

One method that can be used to create links between lexia using the contents map of the present invention is shown in FIGS. 17a and 17b. In the example shown in FIGS. 17a and 17b, a link is created from the word "data" in the second line of the first paragraph of the lexia displayed in lexia display window 1720 to the lexia represented by lexia symbol 1755 and caricature 1756, respectively, in contents map window 1710.

As shown in FIGS. 17a and 17b, the first step in creating the link, (indicated by circled number "1") is to identify the origin of the link in the lexia displayed in lexia display window 1720. In the embodiment shown in FIGS. 17a and 17b, the origin of the link is identified by positioning a mouse cursor 1781 over the origin and clicking a mouse button. In the embodiment shown in FIGS. 17a and 17b, the origin is identified by a box 1782 around the word "data".

In one embodiment of the invention, clicking a mouse button on a location in the lexia display window brings up a pop-up menu that allows a variety of actions to be selected. One of the actions that can be selected is creating a link. In one embodiment, the creating a link is the default mode of action for a mouse click on the lexia display window.

In the embodiment of FIGS. 17a and 17b, once the origin of a link has been identified, the target lexia of the link is identified. In the embodiment of FIGS. 17a and 17b, the target lexia is identified by positioning a mouse cursor 1790 over the lexia symbol in contents map window 1710 representing the target lexia and selecting the lexia, for example by clicking a mouse button. A link is then automatically created between the origin identified in lexia display window 1720 and the lexia represented by the selected lexia symbol. In one embodiment of the invention, a target lexia can be specified by selecting the corresponding lexia symbol either in contents map window 1710 or in navigation window 1730.

The step of positioning a cursor over the symbol for the target lexia is indicated by the circled number "2" in FIGS. 17a and 17b. As shown in FIGS. 17a and 17b, in this embodiment, positioning a cursor over a lexia symbol in contents map window 1710 causes the underlying lexia symbol to be identified both in contents map window 1710 and in navigation window 1730 by a spaced outline around the periphery of the lexia symbol. Accordingly, positioning cursor 1790 over lexia symbol 1755 in contents map window 1710 of FIG. 17a causes spaced outlines 1792 and 1793 to be displayed around lexia symbol 1755 in contents map window 1710 and lexia symbol 1760 in navigation window 1730, respectively. Similarly, in the embodiment of FIG. 17b, positioning cursor 1790 over lexia caricature 1756 in contents map window 1710 of FIG. 17b causes spaced outlines 1795 and 1793 to be displayed around caricature 1756 and lexia symbol 1760, respectively.

In one embodiment of the invention, similar outlines appear around lexia symbols in the content map window and the navigation window when a cursor is positioned over a location that is an origin of a link in the lexia display window. In this case, the outline identifies the lexia symbols representing the lexia that is the target of the link that begins at the cursor location.

In the embodiments of FIGS. 17a and 17b, positioning a cursor over a lexia symbol in contents map window 1710 causes a pop-up label 1799 to be displayed that shows the title of the lexia represented by the lexia symbol over which the cursor is positioned. In the examples of FIGS. 17a and 17b, the title of the lexia is "Lexia Data". In one embodiment of the invention, the title and/or the summary of a lexia are displayed when a cursor is positioned over a lexia symbol representing the lexia. In other embodiments, other data fields of the underlying lexia may be displayed, and different data fields may be displayed in an editing mode than in a viewing mode. The fields that are displayed may be user selectable. For example, in one embodiment, an author may elect to display a nickname field and a summary field during editing, and a title field and a summary field during viewing.

In the embodiment of FIG. 17a, the activation area for the link that is created from the lexia represented by lexia symbol 1745 to the lexia represented by lexia symbol 1755 consists of a word from the text of the lexia represented by lexia symbol 1745, namely the word "data." In this case, activation area for a link comprises text taken from the source lexia. In other embodiments, the activation area for a link may comprise text taken from the source lexia, text taken from the target lexia, or a data field such as a title or summary extracted from either the source or target lexia, as selected by the user.

The present invention allows the placement of special purpose or special function graphical elements onto the contents map that operate on lexia symbols that are placed or "dropped" on or near the special purpose elements. The special purpose elements include elements that provide formatting and that create links.

Figure 18A:
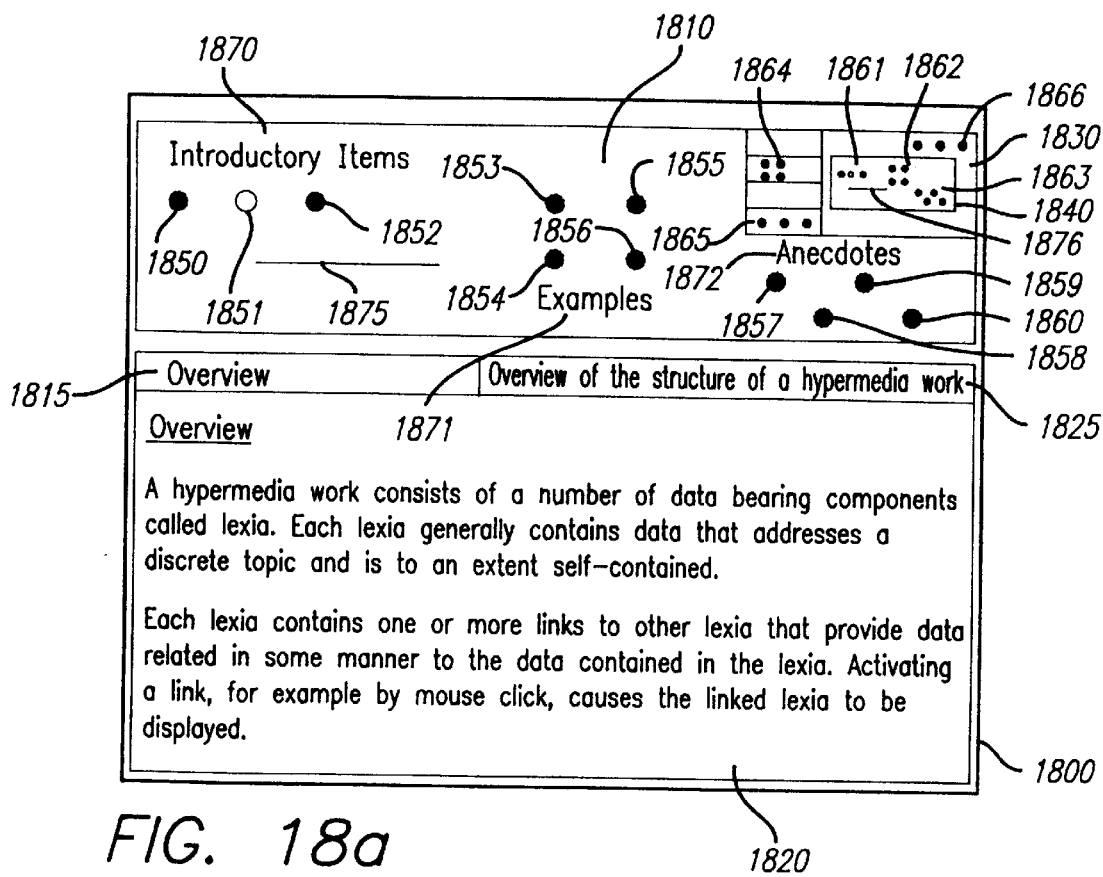
FIG. 18a is an illustration of a display screen during the creation of a hypermedia work for one embodiment of the present invention.
Figure 18B:
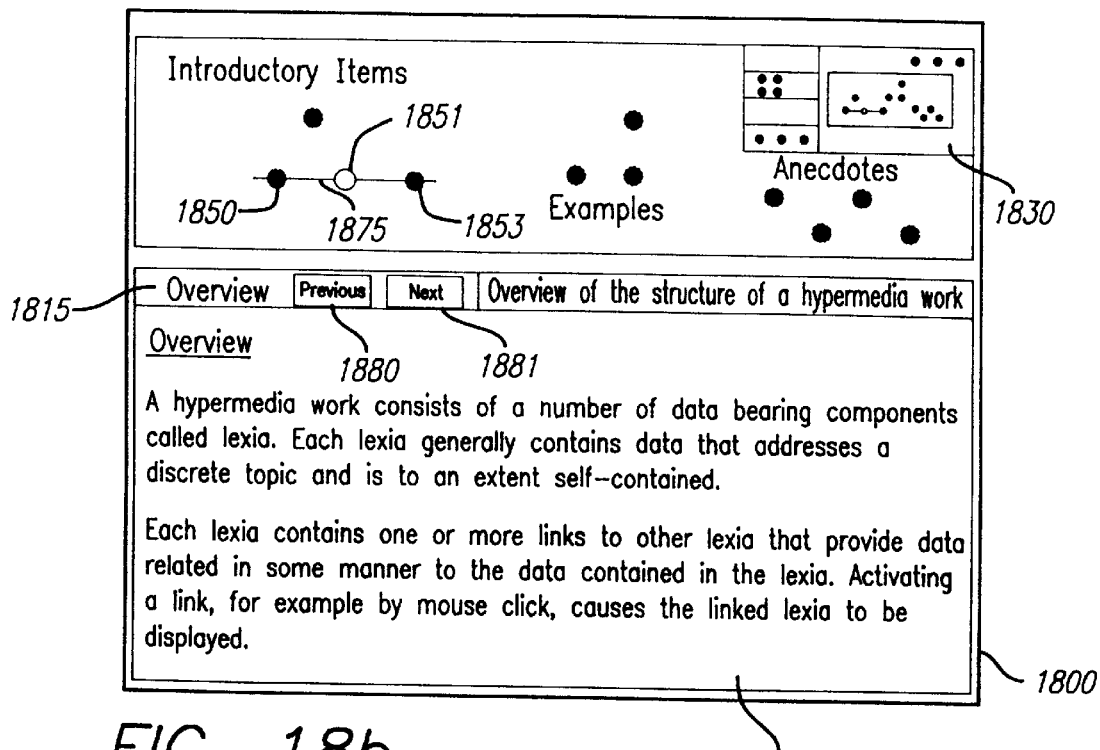
FIG. 18b is an illustration of the display screen of FIG. 18a after lexia symbols have been placed on a link creation element according to one embodiment of the present invention.
Figure 18C:
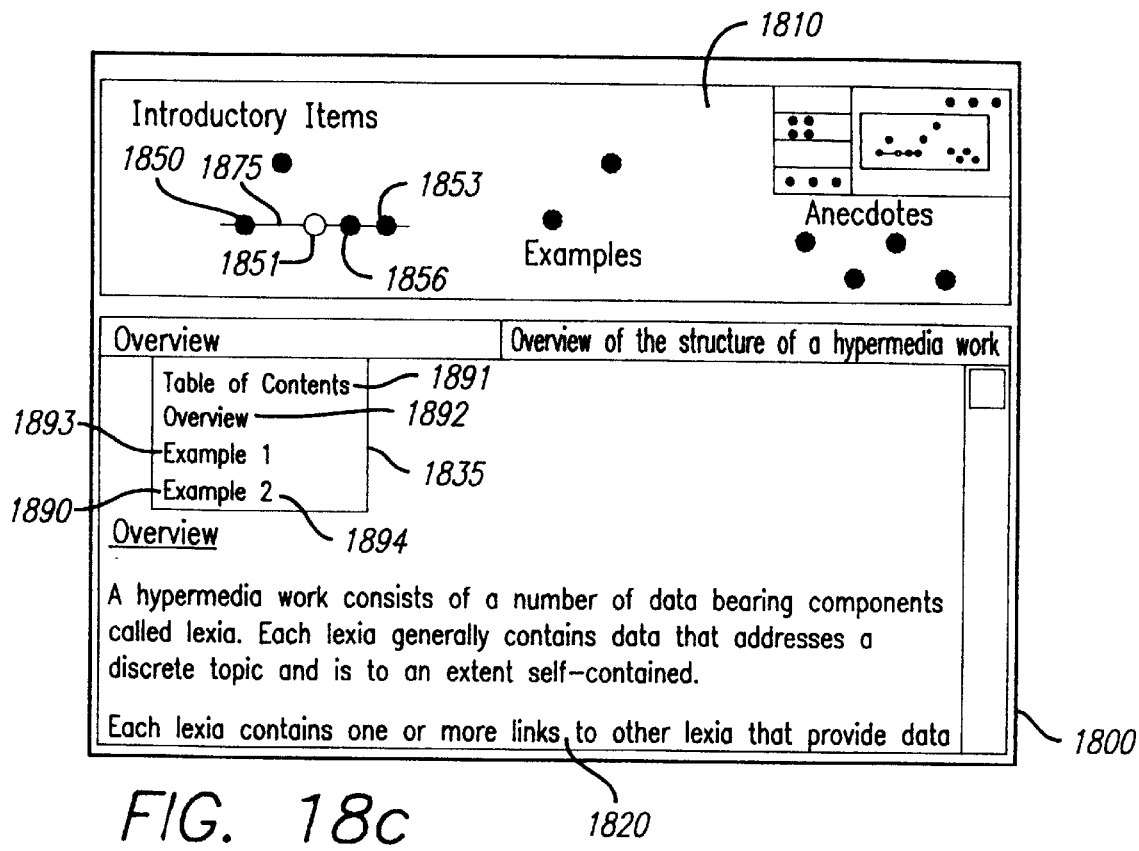
FIG. 18c is an illustration of the display screen of an embodiment of the present invention in which ordered links created by an ordered link creation element are in the form of ordered lists.

The operation of an element that creates links in one embodiment of the present invention is shown in FIGS. 18a—c.

FIG. 18a shows a display screen 1800 during the creation of a hypermedia work for one embodiment of the present invention. Display screen 1800 contains contents map window 1810, lexia display window 1820, navigation window 1830, and scrolling frame 1840. The position of scrolling frame 1840 indicates the portion of the contents map that is being displayed in contents map display window 1810. In FIG. 18a, the display mode being used for contents map window 1810 is a mode in which lexia symbols in the form of colored dots are used to represent lexia.

The portion of the contents map displayed in contents map window 1810 contains a number of lexia symbols that have been arranged by the author of the hypermedia work being created into groups that are useful to the author. Lexia symbols 1850, 1851 and 1852 form one group. Lexia symbol 1851 is highlighted, indicating that the lexia represented by lexia symbol 1851 is the currently selected lexia whose content is being displayed in lexia display window 1820. Lexia symbols 1853, 1854, 1855, and 1856 form a second group. Lexia symbols 1857, 1858, 1859, and 1860 form a third group. The author has also created floating text labels 1870, 1871, and 1872 adjacent to the three groups of lexia symbols, respectively, to help the author identify the groups.

The three groups of lexia displayed in contents map window 1810 are also displayed as groups of lexia symbols 1861, 1862 and 1863, respectively, in the portion of navigation window 1830 within scrolling window 1840. Navigation window 1830 also contains three additional groups of lexia symbols 1864, 1865 and 1866. These lexia symbols are outside of the portion of the contents map being displayed in contents map window 1810 and are therefore not currently displayed in contents map window 1810. A lexia symbol contained in navigation window 1830 but not currently displayed in contents map window 1810 can be displayed by moving scrolling window 1840 to encompass the desired lexia symbol.

In the embodiment of FIG. 18a, the author has also caused a special function element 1875 to be created and displayed in contents map display window 1810. In one embodiment of the present invention, special function element 1875 may be created by an author by positioning a cursor over the desired location for the special function element and clicking a mouse button. In response, a pop-up menu appears from which the author can choose the type of element the author wishes to create. In one embodiment of the invention, the menu choices for types of elements include lexia, formatting elements, link creation elements, and others.

The graphical representation of a special function element displayed in contents map window 1810 is not restricted to any particular form and size. Different representations may be used for different types of special function elements. Representations of special function elements may include, without limitation, text, geometric designs, drawings, images, photographs and symbols, and may be static, dynamic, or animated.

In the embodiment of FIG. 18*a*, special function element 1875 is displayed in the form of a bar in contents map window 1810. Special function element 1875 is also displayed in the form of a smaller bar 1876 in navigation window 1830. Thus the same general form of representation for special function element 1875 is used in contents map window 1810 and navigation window 1830. In other embodiments, different forms of representation may be used in each of navigation window 1830 and contents map window 1810.

In the embodiment of FIG. 18*a*, a special function element displayed as a bar constitutes an ordered link creation element. This type of element creates ordered links between lexia represented by lexia symbols placed, for example by "dragging and dropping" using a mouse, on or near the image of the element displayed in contents map window 1810. In one embodiment of the invention, a symbol must be placed directly on a special function element in order for the special function element to operate on the lexia represented by the lexia symbol. In another embodiment, a symbol placed sufficiently near but not directly on a special function element is considered to be located on the element such that the element operates on the corresponding lexia. In one embodiment, a special function element has a "snap-to" feature such that symbols placed sufficiently near but not on the element are automatically moved onto the element FIG. 18*b* shows the display window 1800 of FIG. 18*a* after lexia symbols 1850, 1851, and 1853 have been dragged and dropped, using a mouse, onto ordered link creation element 1875. The resultant configuration of lexia symbols is also shown in navigation window 1830. In the embodiment of FIG. 18*b*, placing lexia symbols on an ordered link creation element creates links among the lexia represented by the lexia symbols placed on the link creation element according to the order of placement of the lexia symbols on the link creation element. In the embodiment of FIG. 18*a*, "next" and "previous" links are created between the lexia represented by any two adjacent lexia symbols on ordered link creation element 1875.

In FIG. 18*b*, lexia display window 1820 shows "previous" and "next" link activation buttons 1880 and 1881, respectively, created by placing lexia symbol 1851 between lexia symbols 1850 and 1853 on ordered link creation element 1875. Lexia symbol 1851 is highlighted, indicating that the lexia represented by lexia symbol 1851 is the currently selected lexia that is being displayed in lexia display window 1820.

In the embodiment of FIG. 18*b*, placing a first lexia symbol to the right of a second lexia symbol on an ordered link creation element such as ordered link creation element 1875 creates a "previous" link from the lexia represented by the first lexia symbol to the lexia represented by the second lexia symbol. Accordingly, in the embodiment of FIG. 18*b*, previous links are established from the lexia represented by lexia symbol 1851 to the lexia represented by lexia symbol 1850, and from the lexia represented by lexia symbol 1853 to the lexia represented by lexia symbol 1851. In the embodiment of FIG. 18*b*, the lexia represented by lexia symbol 1851 is displayed in lexia display window 1820. The previous link from the lexia represented by lexia symbol 1851 to the lexia represented by lexia symbol 1850 is represented by previous button 1880. Activating previous button 1880 causes the lexia represented by the lexia symbol 1850 to become selected and displayed in lexia display area 1820.

In a similar manner, in the embodiment of FIG. 18*b*, placing a first lexia symbol to the left of a second lexia symbol on an ordered link creation element such as ordered link creation element 1875 creates a "next" link from the lexia represented by the first lexia symbol to the lexia represented by the second lexia symbol. Accordingly, in the embodiment of FIG. 18*b*, next links are established from the lexia represented by lexia symbol 1850 to the lexia represented by lexia symbol 1851, and from the lexia represented by lexia symbol 1851 to the lexia represented by lexia symbol 1853. In the embodiment of FIG. 18*b*, the next link from the lexia represented by lexia symbol 1851 to the lexia represented by lexia symbol 1853 is represented by next button 1881. Activating next button 1881 causes the lexia represented by the lexia symbol 1853 to become selected and displayed in lexia display area 1820.

Link activation buttons 1880 and 1881 created by ordered link creation element 1875 may have labels other than the "Previous" and "Next" labels shown in FIG. 18*b*. For example, in one embodiment, the labels used for link activation buttons 1880 and 1881 are the titles extracted from the target lexia. In other embodiments, other labels may be used.

In one embodiment of the invention, the arrangement of lexia symbols on a link creation element is changeable. The order of lexia symbols on a link creation element can be changed, lexia symbols can be freely added and removed, at any location on a link creation element, and the spacing between lexia symbols on a link creation element can vary. In one embodiment, the links created by the link creation element are automatically revised according to any changes made to the composition and configuration of lexia symbols on the link creation element.

In one embodiment of the present invention, the ordered links created by placing lexia symbols on ordered link creation element 1875 may be in the form of an ordered list instead of in the form of next/previous links. In one embodiment, the type of link created by ordered link creation element 1875 can be selected by an author when the link creation element is created, and can also be changed by editing the link creation element after creation.

FIG. 18*c* shows an embodiment in which the ordered links created by ordered link creation element 1875 have been selected by the author to be in the form of ordered lists. In this embodiment, as compared to the embodiment of FIG. 18*b*, an additional lexia symbol 1856 has been dropped onto ordered link creation element 1875 between lexia symbols 1851 and 1853. Ordered link creation element 1875 now contains four lexia symbols. In this embodiment, a link is created from each lexia represented by a lexia symbol on ordered link creation element 1875 to each lexia represented by each of the other lexia symbols on ordered creation element 1875. Because there are a total of four lexia symbols on ordered link creation element 1875 in FIG. 18c, for each lexia symbol, there are three other lexia symbols on ordered link creation element 1875. Accordingly, for each lexia represented by a lexia symbol on ordered link creation element 1875, links are created to three other lexia. These links are represented in a lexia by a list of the titles of the lexia that are the targets of the links. The embodiment of FIG. 18c automatically extracts the titles from the lexia represented by lexia symbols on ordered link creation element 1875 and inserts these titles, in the form of a list, as link activation areas into the other lexia represented by lexia symbols on ordered link creation element 1875. The titles are arranged in an order corresponding to the order that the lexia symbols are arranged on ordered link creation element 1875. In the embodiment of FIG. 18c, the title of the lexia in which the links are being created is also extracted and displayed as part of the list of titles. However, this title does not form a link activation area. It is included to provide a complete list of the lexia that are grouped on link creation element 1875. In another embodiment, the title of the lexia in which the links are being created is omitted from the list of titles.

FIG. 18c shows the resulting list 1890 of titles that is inserted in the lexia represented by highlighted lexia symbol 1851 in one embodiment of the invention. List 1890, contained in a frame 1835, consists of the titles of the lexia represented by the lexia symbols arranged on ordered link creation element 1875 in the order in which the corresponding lexia symbols 1850, 1851, 1856, and 1853 appear on ordered link creation element 1875. Title 1891, "Table of Contents," is thus the title of the lexia represented by lexia symbol 1850, title 1892, "Overview," is the title of the lexia represented by lexia symbol 1851 (which is also the currently displayed lexia into which the list is being inserted), title 1893, "Example 1" is the title of the lexia represented by lexia symbol 1856, and title 1994, "Example 2," is the title of the lexia represented by lexia symbol 1853. Titles 1891, 1893 and 1894 constitute link activation areas to the corresponding lexia. Selecting any of the titles 1891, 1893 and 1894 in list 1890, for example by positioning a cursor over a title and activating a mouse button, causes the lexia having the selected title to be displayed. Title 1892 is the title of the currently displayed lexia, and does not constitute a link activation area.

In a similar manner, lists of links are inserted into the lexia represented by lexia symbols 1850, 1856 and 1853.

In the embodiment of FIG. 18c, the list of links inserted into each of the lexia represented by lexia symbols on ordered link creation element 1875 consists of a list of the titles of the lexia extracted from the lexia. In other embodiments, the list may consist of other and/or additional items. For example, the list may consist of the title and the summary for each lexia, or the summary only, or the nickname, or some other data field extracted from each of the underlying lexia.

In one embodiment of ordered link creation element 1875, a criteria other than the relative position of lexia symbols on ordered link creation element 1875 may be used to determine the target lexia of "next" and "previous" links or the links contained on a table of links created by link creation element 1875. In one embodiment, ordered link creation element 1875 includes an "autosort" capability that sorts the lexia represented by lexia symbols placed on the element according to a user selectable criteria. For example, in one embodiment, the lexia are sorted according to the lexia titles. If the links created by this embodiment of an ordered link creation element are represented in the form of "next" and "previous" links in a lexia, the target lexia of such "next" and "previous" links are the lexia whose titles come immediately after and immediately before the lexia in which the links are being created in an alphabetical listing of their titles. Alternatively, if the links are represented by a list of titles to the target lexia, the target lexia are arranged in the list according to the alphabetical order of their titles. In other embodiments, other sort criteria may be used. In one embodiment, the lexia symbols are automatically rearranged on link creation element 1875 to reflect the autosorted order of the underlying lexia. In another embodiment, the autosorting feature does not change the arrangement of the lexia symbols.

In one embodiment of the invention, if any data field of a first lexia is changed, and that data field is used in a second lexia, for example for identifying a link, the change to the data field is reflected in the second lexia. For example, in the embodiment of FIG. 18c, if the title of the lexia represented by lexia 1856 is changed from "Example 1" to "A Simple Example", the new title "A Simple Example" will appear in list of links 1890 in the place of the old title "Example 1" after the change is made.

In one embodiment of the invention, a list of links such as list 1890 of FIG. 1890 is editable in lexia display window 1820 when lexia display window is in an editing mode. Changes made in the list are reflected back into the underlying lexia and into contents map window 1810, as appropriate. For example, if list of links 1890 is edited in lexia display window 1820 so as to interchange the positions of the titles "Table of Contents" and "Overview", the order of the corresponding lexia symbols 1850 and 1851 is reversed in contents map window 1810. Similarly, if the title of a new lexia is added to list 1890 in lexia display window 1820, a corresponding lexia symbol is added to the lexia symbols on ordered link creation element 1875 in contents map window 1810.

The special purpose graphical elements of the present invention such as ordered link creation element 1875 may include "inheritance properties" that are automatically or optionally applied to lexia represented by lexia symbols placed on the special purpose graphical elements. Examples of inheritance properties are page and text formats that are automatically applied to a lexia when its lexia symbol is placed on the special purpose graphical elements. One embodiment of the invention includes graphical formatting elements that perform no other function other than providing inheritance properties to lexia represented by lexia symbols placed on such formatting elements.

In the embodiment of FIG. 18c, ordered link creation element 1875 contains inheritance properties that specify the layout, placement and appearance of the lists of links that are added to lexia represented by lexia symbols that have been placed on ordered link creation element 1875. These inheritance properties specify that the list is to be displayed in a frame at a specified location on the underlying lexia, that particular font types, sizes and colors are to be used in the list, and that the background color of the frame into which the list is placed is to have a specified color. A consistent look is thus created for the lexia corresponding to the lexia elements placed on ordered link creation element 1875.

In one embodiment, the inheritance properties provided by a link creation element may include items unrelated to the links being created by the link creation element. For example, an inheritance property may specify the general page layout to be applied to each lexia represented by a lexia symbol placed on the link creation element. The link creation element may specify such items as the position of titles, text, and graphic frames on the underlying lexia, the types, colors, and sizes of fonts used, the background wallpaper, if any used for the lexia, and other page layout features.

Figure 26:
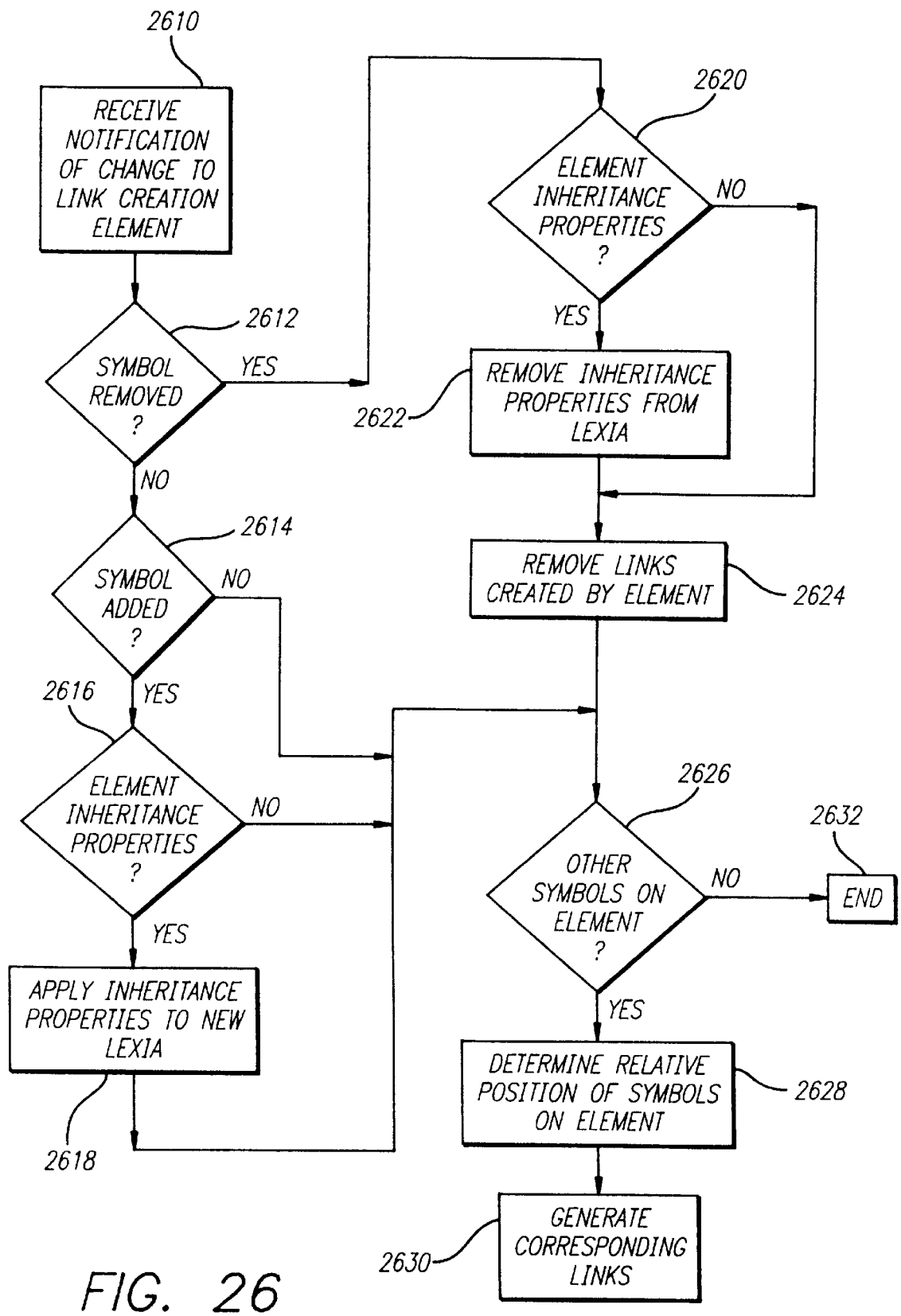
FIG. 26 is a block diagram of the process used to modify links in response to changes to a link creation element in one embodiment of the present invention.

FIG. 26 is a block diagram of the process used to modify links in response to changes to a link creation element in one embodiment of the present invention. As shown in FIG. 26, the process starts when notification is received that a change has been made to a link creation element at block 2610. At block 2612 a determination is made as to whether the change involved the removal of a lexia symbol from the link creation element. If a lexia symbol was removed from the link creation element, a determination is made at block 2620 as to whether the link creation element imposes inheritance properties on the lexia represented by lexia symbols placed on the link creation element. If the link creation element imposes inheritance properties, those inheritance properties are removed from the lexia represented by the removed lexia symbol at block 2622. Links to and from the lexia represented by the removed lexia symbol are removed at block 2624. A determination is made at block 2626 as to whether there are any other remaining lexia symbols on the link creation element. If there are no other lexia symbols on the link creation element, the process ends at block 2632.

If there are other lexia symbols remaining on the link creation element, the relative positions of those lexia symbols with respect to each other is determined at block 2628, and links corresponding to the relative positions of the lexia symbols on the link creation element are created at block 2630.

If a determination is made at block 2620 that the link creation element does not impose any inheritance properties, the process skips block 2622 and goes directly to block 2624.

If it is determined at block 2612 that the change to the link creation element does not involve removal of a lexia symbol, a determination is made at block 2614 as to whether the change involves addition of a lexia symbol to the link creation element. If the change does not involve the addition of a lexia symbol, the process continues to block 2626.

If the change does involve the addition of a lexia symbol, a determination is made at block 2616 as to whether the link creation element imposes any inheritance properties. If the link creation element does not impose any inheritance properties, the process continues to block 2626.

If the link creation element does impose inheritance properties, the inheritance properties are applied to the lexia represented by the lexia symbol that has been placed on the link creation element at block 2618. The process then continues to block 2626.

In the embodiment of FIG. 26, inheritance properties are imposed by a special purpose element at the time a lexia symbol is placed on the special purpose element, and are stored as part of the underlying lexia. In another embodiment, inheritance properties of a special purpose element are imposed only when needed. For example, in one embodiment of the invention, formatting inheritance properties are only imposed on the lexia when the lexia is being formatted, either for display on a display screen or for generating a caricature or an exportable representation of the lexia. In this embodiment, when a lexia symbol is selected for display, a determination is made as to whether the lexia symbol is on any special purpose element that imposes formatting inheritance properties. If such a special purpose element is found, its inheritance properties are incorporated in the displayed lexia. If a lexia symbol is subsequently removed from a special purpose element that imposes inheritance properties, the next time the lexia symbol is selected, the lexia will be displayed without those inheritance properties.

In one embodiment, special purpose formatting elements provide format and layout related inheritance properties without providing other functions such as creating links. FIG. 18e shows one embodiment of a special purpose formatting element 1888 of the present invention. As shown in FIG. 18e, in this embodiment, special purpose formatting element 1888 is displayed in contents map display window 1810 as a shaded rectangle with rounded corners containing a white rectangle with a black line under the rectangle. Formatting element 1888 is also displayed in navigation window 1830 as shaded rectangle 1889. Lexia symbol 1855 has been placed onto formatting element 1888 in contents window 1810. Accordingly, the formatting inheritance properties of formatting element 1888 are applied to the lexia represented by lexia symbol 1855.

The lexia represented by lexia symbol 1855 is displayed in lexia display window 1820. In the embodiment of FIG. 18e, the formatting inheritance properties of formatting element 1888 for the lexia represented by a lexia placed on formatting element 1888 specify a page layout consisting of a frame for a graphic centered at the top of the lexia, a headline having a first designated font centered below the graphic frame, and a body of text having a second designated font left justified below the headline. These features are shown in lexia display window 1820 of FIG. 18e as frame 1882, headline 1883, and body text 1884, respectively. The same page layout is applied to the lexia represented by any other lexia symbol placed on formatting element 1888.

In one embodiment of the invention, special purpose elements may be placed on other special purpose elements. For example, a link creation element may be placed on a formatting element. The formatting inheritance properties of the formatting element will then be applied to the links created by the link creation element and/or the lexia represented by lexia symbols on the link creation element.

In one embodiment of the invention, a special purpose element such as ordered link creation element 1875 may be manipulated and edited in contents map window 1810. For example, a special purpose element may be selected, dragged and dropped, and changed in length, size, and orientation. In one embodiment of the invention, moving a special purpose element, for example by dragging and dropping using a mouse, moves the special purpose element without moving any lexia symbols that had been placed onto the special purpose element. As a result, links that had been created between the lexia represented by the lexia symbols that are no longer on the special purpose element are destroyed. In another embodiment, the author may select an option for the special purpose element that causes lexia symbols placed on the special purpose element to be "glued" to the element so that when the element moves, the lexia symbols placed on it move as well. In this case, links created between lexia by the special purpose element are preserved. In one embodiment, such "gluing" optionally only applies one way from the element to the lexia symbols placed on the element such that moving the element moves the lexia symbols placed on the element, but moving a lexia symbol does not move the element. In one embodiment, selecting a special purpose element allows parameters of the special purpose element to be edited. In one embodiment, the editable parameters include the function performed by the element (for example, whether the element is to be a link creation element, a formatting element, or another type of element), the type of function (for example, the specific type of link that is to be created, in the case of a link creation element, or the format that is to be applied, in the case of a formatting element), whether lexia symbols become glued to the element once placed on the element so that if the element is moved, the lexia symbols move as well, whether the element is displayed when the contents map window is displayed in either an editing mode, a viewing mode, or both, whether the element provides any inheritance properties that are applied to lexia represented by lexia symbols placed on the element, and other parameters. An element may also include editable data fields associated with the element, similar to the data fields associated with a lexia, such as data fields a name, a nickname, a summary description, an index value, or other data.

In one embodiment of the invention, links can be created from a lexia to a special purpose element in the same manner as links are created between lexia in the embodiment of FIGS. 17a and 17b. For example, a link between a currently displayed lexia and a special purpose element may be created by clicking on the desired location for the link activation area for the link in the lexia display window and then selecting the special purpose element in the contents map display window as the target of the link. Depending upon the option chosen by the user, the link activation area for the link may be represented by text or data fields from the source lexia, text or data fields from the target special purpose element, or text or data fields from the lexia represented by any lexia symbols that have been placed on the special purpose element.

Figure 18D:
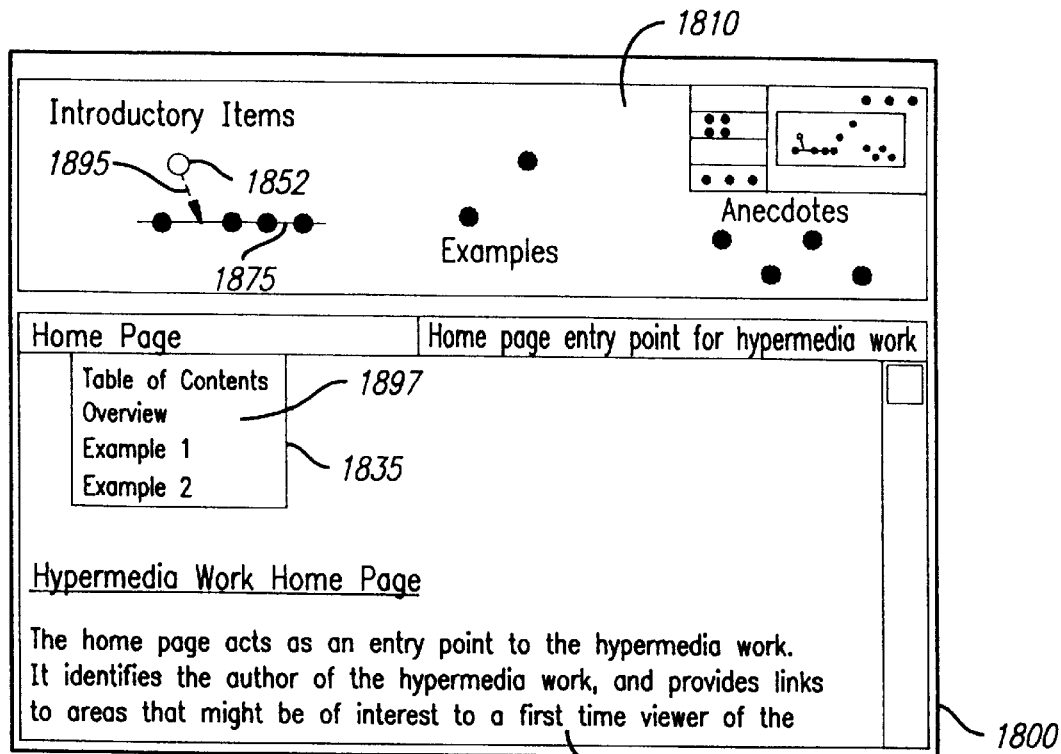
FIG. 18d is an illustration of the display screen of an embodiment of the present invention including a hierarchical link creation element.
Figure 18E:
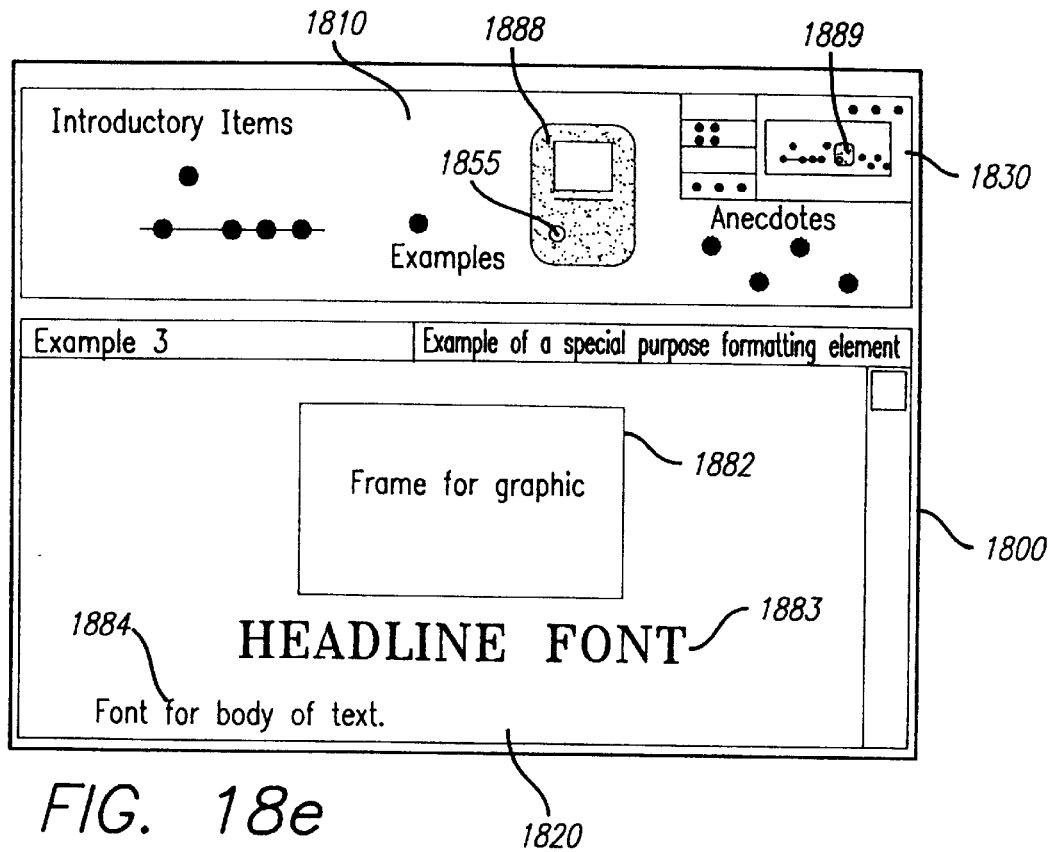
FIG. 18e is an illustration of the display screen of one embodiment of the present invention including a special purpose formatting element.
Figure 18F:
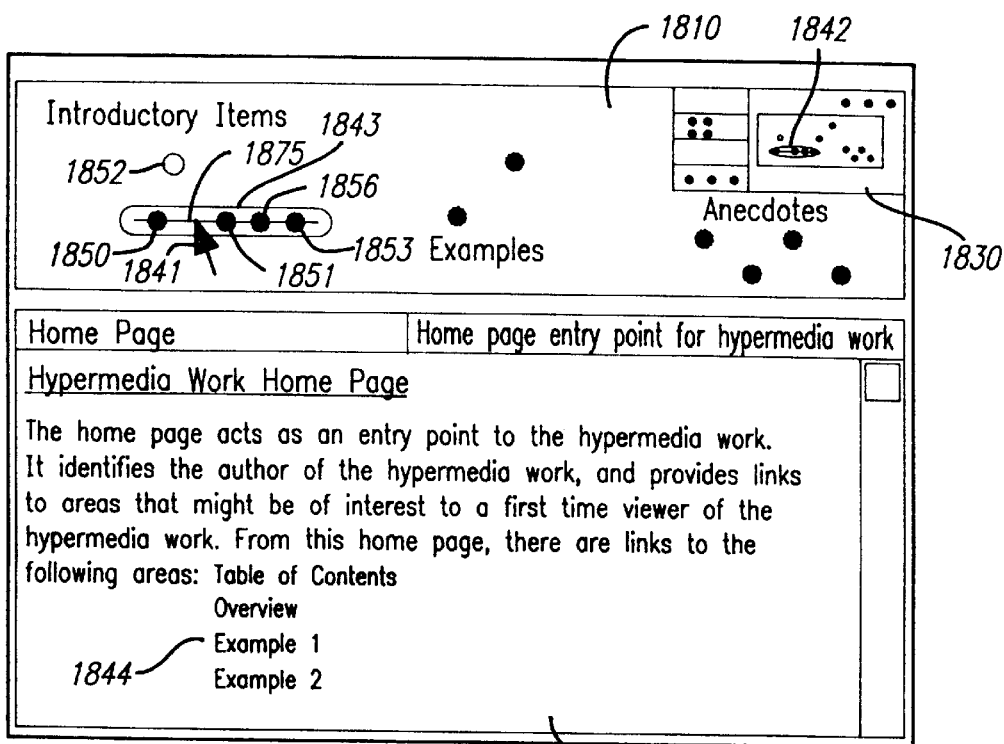
FIG. 18f shows an example of a link from a lexia to a special purpose element in one embodiment of the present invention.

FIG. 18f shows an example of a link from a lexia to a special purpose element in one embodiment of the present invention. The link was created in a manner similar to that described above with respect to the embodiments of FIGS. 17a and 17b. In FIG. 18f, lexia symbol 1852 is highlighted and the lexia represented by lexia symbol 1852 is displayed in lexia display window 1820. A link has been created from the lexia represented by lexia symbol 1852 to special purpose element 1875 in contents map window 1810. The link activation area for the link was designated by positioning a cursor over the desired location in lexia display window 1820 and clicking a mouse button. The target of the link was then selected by positioning the cursor over special purpose element 1875 clicking a mouse button. FIG. 18f shows the subsequent state of the display screen. Cursor 1841 remains positioned over special purpose element 1875 in contents map window 1810. A border 1843 around special purpose element 1875 indicates that cursor 1841 is positioned over special purpose element 1875. As a result of creation of the link, a link activation area 1844 has been inserted into the source lexia at the location specified for the link activation area for the link. The makeup of the link activation area 1844 inserted in a source lexia as a result of creation of a link to a special purpose element depends on the type of special purpose element to which the link is established and on the type of activation area representation selected by the user. In the embodiment of FIG. 18f, the special purpose element 1875 to which the link has been established is an ordered link creation element. The corresponding configuration of the link activation area 1844 for the embodiment of FIG. 18f is a list of link activation areas comprising the titles of the lexia represented by the lexia symbols on special purpose element 1875. In other embodiments, the link activation area to a special purpose element may consist of text or data fields from the source lexia, text or data fields from the special purpose element, text or data fields from the lexia represented by lexia symbols located on the special purpose element, or other items.

FIG. 18d shows an embodiment of the present invention that includes a special purpose element 1895 that creates a parent-child hierarchical relationship between a lexia or a group of lexia and another lexia or a group of lexia. In FIG. 18d, hierarchical link creation element 1895, represented by a dotted arrow, has been added to contents map window 1810 of the embodiment of FIG. 18c. Hierarchical link creation element 1895 creates a parent-child link between lexia represented by lexia symbol 1852 at the tail of the arrow and, in the embodiment of FIG. 18d, ordered link creation element 1875 at the head of the arrow. In other embodiments, hierarchical link creation element 1895 may connect a lexia symbol to a lexia symbol, a special purpose element to a lexia symbol, a special purpose element to another special purpose element.

The links created by hierarchical link creation element 1895 are shown in lexia display window 1820. In FIG. 18d, lexia symbol 1852 is highlighted in contents map window 1810. Accordingly, the contents of the lexia represented by lexia symbol 1852 is displayed in lexia display window 1820. The links created by hierarchical link creation element 1895 in the embodiment of FIG. 18d appear as a list of links 1897. Link list 1897 consists of a list of the titles extracted from each of the lexia on hierarchical link creation element 1895. Each title functions as a link activation area activating a link from the lexia represented by lexia symbol 1852 to each of the lexia represented by lexia symbols 1850, 1851, 1856 and 1853 on ordered link creation element 1875.

In other embodiments, the links created by hierarchical link creation element 1875 in the parent lexia represented by lexia symbol 1852 may take forms other than list 1897 in FIG. 18d. For example, in one embodiment, the links are added to the parent lexia in the form of a pull down menu. Other manifestations of links created by the link creation elements of the present invention will be apparent to those skilled in the art.

In the embodiment of FIG. 18d, the links created by hierarchical link creation element 1895 are one way links. In this embodiment, hierarchical link creation element 1895 creates links from the lexia symbol or other element at the tail of hierarchical link creation element 1895 to the lexia symbol or other element at the head of hierarchical link creation element 1895, but does not create links the other way.

In one embodiment of the invention, hierarchical link creation element 1895 is created by clicking a mouse button on contents map window 1810, choosing a "create hierarchical link" option from a pop up window, and indicating the tail and head locations of the desired hierarchical link.

In the embodiment of FIG. 18d, hierarchical link creation element 1895 creates links from the lexia represented by lexia symbol 1852 to each of the lexia represented by the lexia symbols on ordered link creation element 1875. One embodiment of the invention includes hierarchical link creation elements that create links only to the lexia represented by lexia symbols placed at particular locations on link creation elements such as ordered link creation element 1875. For example, one hierarchical link creation element creates a link only to the lexia represented by the first lexia symbol on a link creation element. Another example hierarchical link creation element creates a link only to the lexia represented by the last lexia symbol on a link creation element. In one embodiment, a hierarchical link creation element, displayed as an arrow in the contents map window of the present invention, creates a link only to the lexia represented by a lexia symbol, if any, located at the position indicated by the tip of the arrow. Other variations of the hierarchical link creation element of the present invention will be apparent to those skilled in the art.

Figure 19A:
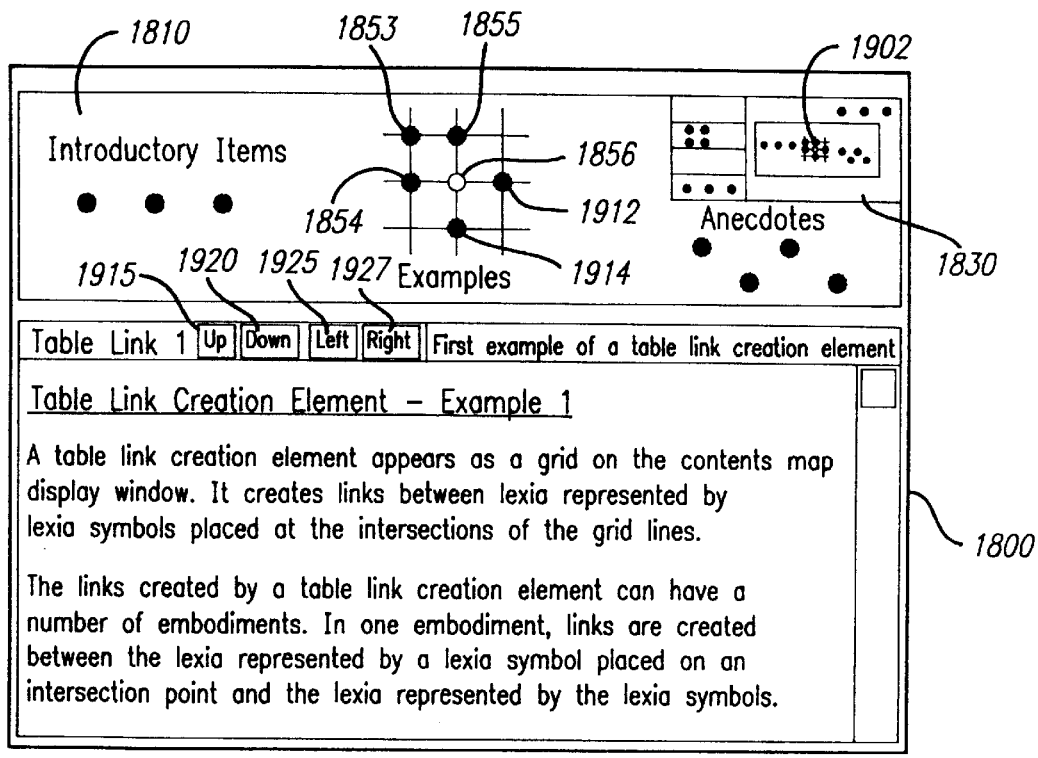
FIG. 19a shows a table link creation element of one embodiment of the present invention.

FIG. 19a shows a table link creation element 1910 of one embodiment of the present invention. In this embodiment, a table link creation element appears as a grid in contents map window 1910. It is also displayed as a smaller grid 1902 in navigation window 1830. Table link creation element 1910 creates links between lexia represented by lexia symbols placed at the intersection points of the grid lines making up table link creation element 1910. In the embodiment of FIG. 19a, table link creation element 1910 contains nine intersection points. Six of the nine intersection points are occupied by lexia symbols 1853, 1855, 1854, 1856, 1912 and 1914, respectively.

The links created by the table link creation element of the present invention can have a variety of forms. In the embodiment of FIG. 19a, links are created from each lexia represented by a lexia symbol placed at an intersection point of the table link creation element to each lexia represented by lexia symbols, if any, located immediately above, below, to the left, and to the right of the lexia symbol.

Lexia display window 1820 of FIG. 19a shows the links created for the lexia represented by highlighted lexia symbol 1856 by table link creation element 1910 in the embodiment of FIG. 19a. Lexia symbol 1855 is located immediately above, lexia symbol 1914 is located immediately below, lexia symbol 1854 is located immediately to the left, and lexia symbol 1912 is located immediately to the right, of lexia symbol 1856 on table link creation element 1910. Accordingly, table link creation element 1910 creates a link from the lexia represented by lexia symbol 1856 to the lexia represented by lexia symbols 1855, 1914, 1854 and 1912. These links are represented by link activation buttons 1915, 1920, 1925 and 1927, respectively. Activating link activation button 1915 will bring up the lexia represented by lexia symbol 1855. Activating link activation button 1920 will bring up the lexia represented by lexia symbol 1914. Activating link activation button 1925 will bring up the lexia represented by lexia symbol 1854. Activating link activation button 1927 will bring up the lexia represented by lexia symbol 1912.

In the embodiment of FIG. 19a, link activation buttons 1915, 1920, 1925 and 1927 are labeled "Up", "Down", "Left" and "Right", respectively. In other embodiments, other labels may be used. In one embodiment, the labels used are the names of the target lexia extracted from the target lexia. In other embodiments, the labels used may consist of data from other data fields of a lexia such as a summary, a nickname, or other data.

Figure 19B:
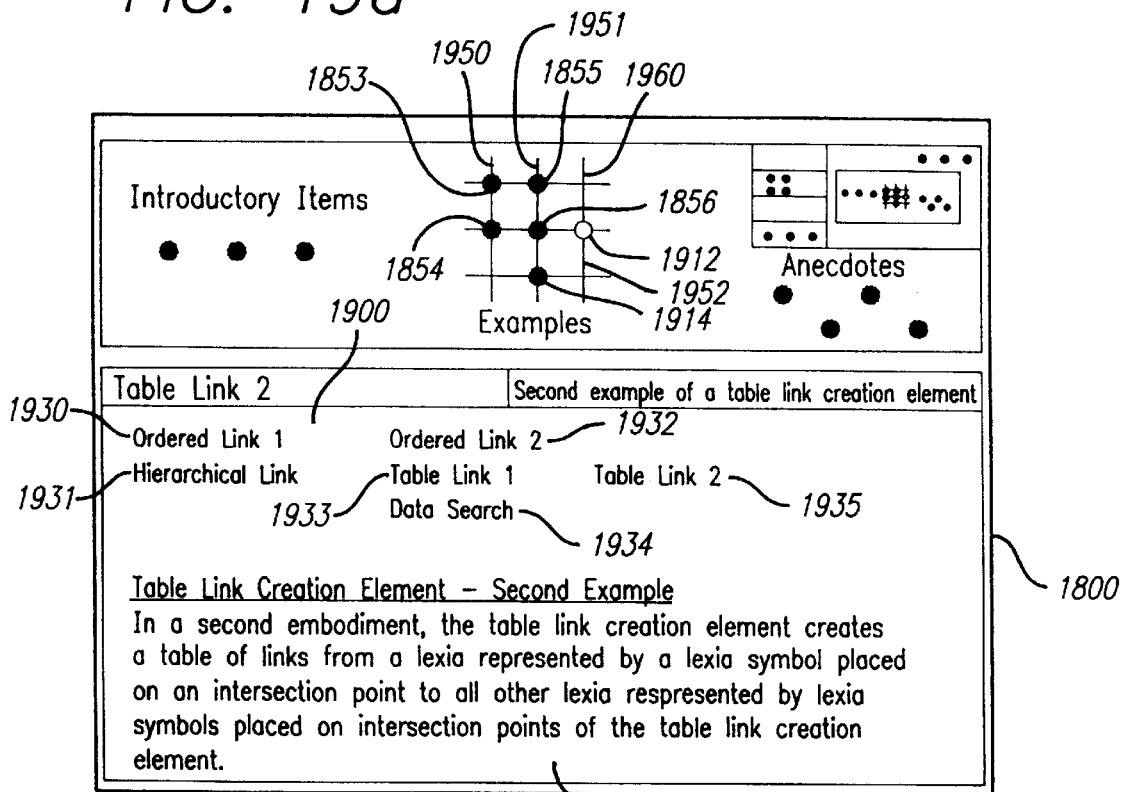
FIG. 19b shows a table link creation element of one embodiment of the present invention.

FIG. 19b shows an embodiment of the present invention in which the links created by table link creation element 1910 are in the form of a table 1900. In FIG. 19b, lexia symbol 1912 is highlighted in contents map window 1810 and the lexia represented by lexia symbol 1912 is displayed in lexia display window 1820. In the embodiment of FIG. 19b, for each lexia represented by a lexia symbol occupying a grid intersection point of table link creation element 1910, a table is created containing links to each lexia represented by each other lexia symbol occupying an intersection point of table link creation element 1910. The links are arranged in the table in a manner that corresponds to the position of the corresponding lexia symbols on table link creation element 1910.

Lexia display window 1820 of FIG. 19b shows the table 1900 in the lexia represented by lexia symbol 1912 created by placing lexia symbol 1912 on table link creation element 1910 in the location shown in FIG. 19b. Table 1900 contains entries corresponding to the lexia symbols located on table link creation element 1910. For the lexia represented by lexia symbol 1912, the table entry consists of an identifier for the lexia represented by lexia symbol 1912. In the embodiment of FIG. 19b, the identifier used is the title of the lexia as extracted from the lexia. For lexia other than the lexia represented by lexia symbol 1912, the entries in table 1900 consist of link activation areas to the respective lexia. In the embodiment of FIG. 19b, the link activation areas consist of the titles of the target lexia as extracted from the lexia themselves. In other embodiments, other data fields of the underlying lexia, such as a summary or nickname, may be used.

Table 1900 consists of three columns of entries corresponding to the three vertical grid lines of table link creation element 1910.

The first column contains link activation areas 1930 and 1931, which create links to the lexia represented by lexia symbols 1853 and 1854, respectively, located on the first vertical grid line 1950 of table link creation element 1910. The first column of table 1900 thus corresponds to the first vertical grid line 1950 of table link creation element 1910.

The second column of table 1900 contains link activation areas 1932, 1933 and 1934, which create links to the lexia represented by lexia symbols 1855, 1856, and 1914, respectively, located on the second vertical grid line 1951 of table link creation element 1910. The second column of table 1900 thus corresponds to the second vertical grid line 1951 of table link creation element 1910.

The third column of table 1900 contains lexia identifier 1935 corresponding to the lexia represented by lexia symbol 1912 on the third vertical grid line 1952 of table link creation element 1910. The third vertical grid line 1952 of table link creation element 1910 contains no lexia symbols other than lexia symbol 1912 itself. Accordingly, there are no other entries is the third column of table 1900. However, if there were additional lexia symbols on third vertical grid line 1952, corresponding link activation areas would be created in corresponding locations in the third column of table 1900.

In one embodiment of the invention, instead of containing an identifier such as the title of the lexia, table 1900 contains a blank entry at the table location corresponding to the lexia in which table 1900 is being created.

It will be apparent to those skilled in the art that links created by placing lexia symbols on a table link creation element of the present invention can be represented in a variety of manners other than the link activation buttons of FIG. 19a and the link activation areas of table 1900 of FIG. 19b. It will also be apparent to those skilled in the art that the link creation elements of the present invention, which create links between the lexia represented by lexia symbols placed or "dropped" on the element, can have a variety of other configurations than the example configurations shown in FIGS. 18a–d and 19a–b.

The present invention provides a search function that allows searches to be made of the content of each of the lexia of a hypermedia work. In one embodiment of the present invention, the lexia symbol representing each lexia that contains the searched for content is indicated both in the contents map window and in the navigation window of the present invention. In one embodiment of the invention, the search function includes the ability to search non-displayed data of a lexia, such as the title, summary, and nickname. In one embodiment, a search can be limited to specified portions or data fields of lexia. For example, a search can be limited to the non-displayed nicknames of lexia, or to nicknames and summaries, or to titles and displayed content.

Figure 20:
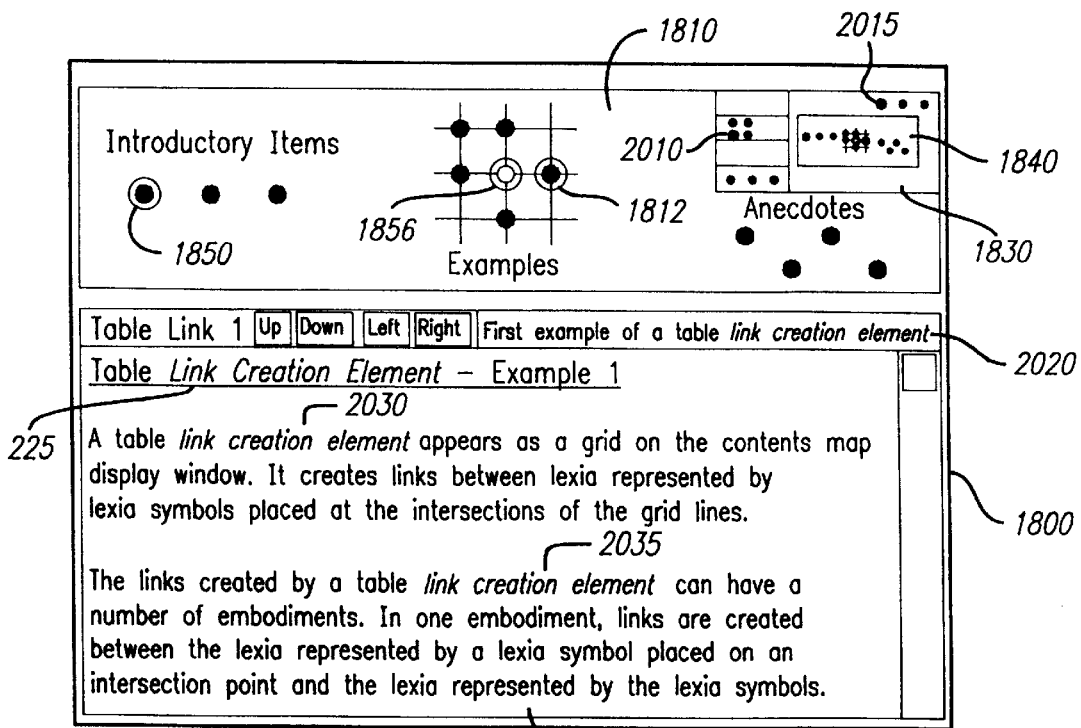
FIG. 20 illustrates a search function provided by one embodiment of the present invention.

FIG. 20 illustrates a search function provided by one embodiment of the present invention. FIG. 20 shows the results of a search for the text phrase "link creation element" in the hypermedia work of FIG. 19a. In this embodiment, each lexia that contains the searched for phrase is indicated by means of a ring around the corresponding lexia symbol. According to FIG. 20, of the lexia whose corresponding lexia symbols are displayed in contents map window 1810, the lexia represented by lexia symbols 1850, 1856, and 1812 contain the searched-for phrase "link creation element". In addition, the hypermedia work of FIG. 20 contains two other lexia that contain the searched for phrase. The lexia symbols for these lexia are not located in the portion of the contents map displayed in contents map window 1810, but are represented by lexia symbols 2010 and 2015 displayed in navigation window 1830, which displays an image of the entire contents map.

The search function of the present invention provides a navigable graphical display of the results of a search. Any of the lexia containing the searched for content can be accessed by selecting an indicated lexia symbol representing the lexia either in contents map window 1810 or in navigation window 1830. In FIG. 20, the lexia corresponding to lexia symbol 1856 has been selected, for example by using a mouse button, and is displayed in lexia display window 1820. In this embodiment, when a lexia containing searched for content is displayed in lexia display window 1820, the searched for content is indicated in lexia display window 1820. As shown in FIG. 20, the searched for phrase "link creation element" is found four times in the portion of the lexia represented by lexia symbol 1856 displayed in lexia display window 1820. In the embodiment of FIG. 20, these four occurrences 2020, 2025, 2030 and 2035 of the phrase "link creation element" are indicated by bold and italicized text.

It will be apparent to those skilled in the art that searches other than simple text searches can be performed by the present invention. It will also be apparent to those skilled in the art that a variety of display elements other than a ring around a lexia symbol can be used to identify lexia containing the searched for item in contents map window 1810 and navigation window 1830.

In one embodiment of the invention, in addition to highlighting the searched for item in a displayed lexia, any links in the displayed lexia to other lexia containing the searched for item are also identified by highlighting. In one embodiment, the search function may search for items such as links. For example, a search can be requested for all links to or from a specific lexia. The results of different searches may be identified by different types or colors of highlighting.

In one embodiment of the invention, the results of a search may be saved for later retrieval. In one embodiment, the results of a search remain displayed until a specified user action or time-out occurs. For example, in one embodiment, a user may elect to have the results of a search remain displayed until a user requests another search or until the user issues a cancellation command.

In the embodiment of FIG. 20, navigation window 1830 provides an overview of the entire contents map of the hypermedia work depicted in FIG. 20. In the embodiment of FIG. 20, navigation window 1830 contains 23 lexia symbols. Accordingly, the hypermedia work depicted in FIG. 20 contains 23 lexia.

Figure 22:
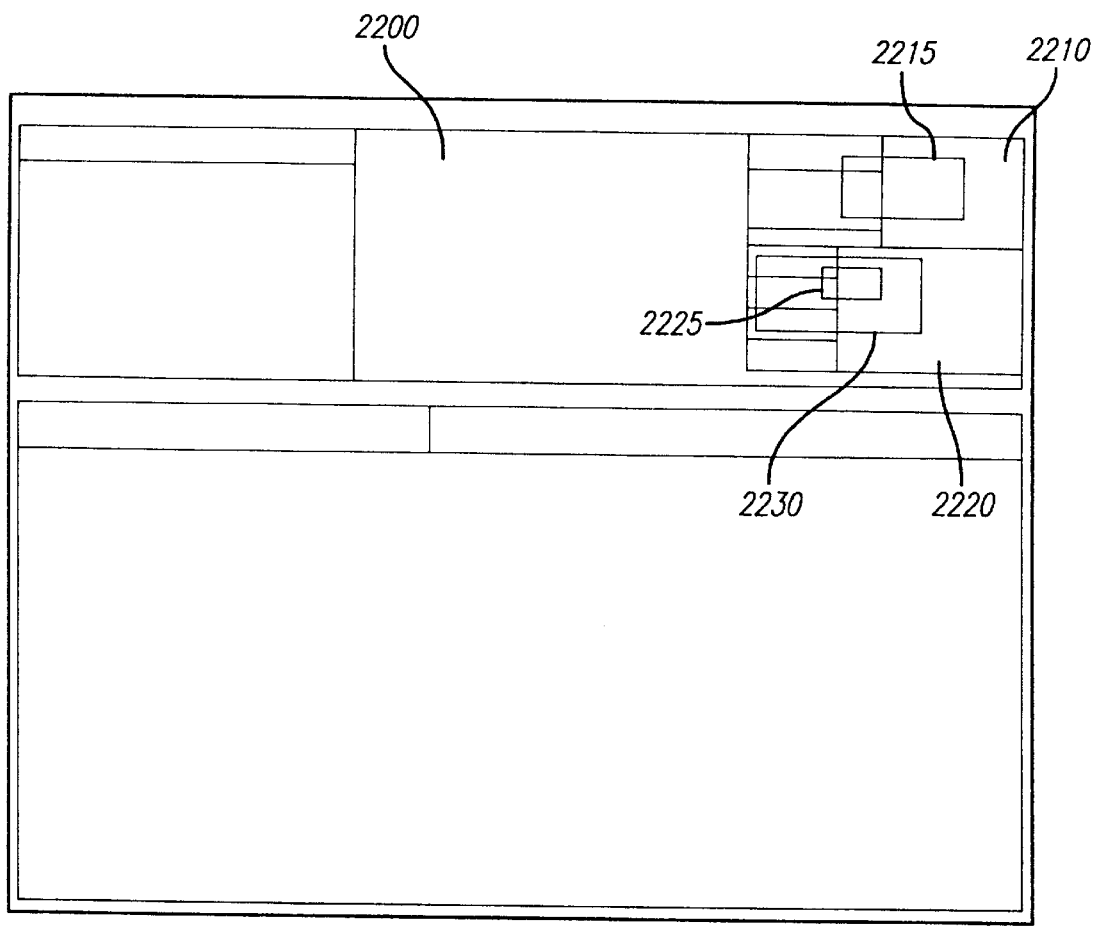
FIG. 22 shows a multi-tiered navigation window of one embodiment of the present invention.

Hypermedia works may be created that contain a thousand or more lexia. Because of limited resolutions of computer display monitors, it may not be possible to distinctly display a thousand or more lexia symbols in a navigation window the size of navigation window 1830. For hypermedia works containing large numbers of lexia, one embodiment of the present invention utilizes multitiered navigation windows according to the method of patent application Ser. No. 08/298,215. As shown in FIG. 22, in this embodiment, three views of the contents map of a hypermedia work are used.

An overview of the entire contents map is provided by top level navigation window 2220. Top level navigation window 2200 contains intermediate scrolling frame 2230 and contents map window scrolling frame 2225. Intermediate scrolling frame 2230 indicates the portion of the contents map that is displayed in intermediate level navigation window 2210. Contents map window scrolling frame 2225 indicates the portion of the contents map that is displayed in contents map window 2200. Either of the two scrolling frames 2225 and 2230 may be moved, for example by dragging with a mouse, within top level navigation window 2220, thereby causing the portion of the contents map displayed in contents map window 220 to change. In one embodiment, dragging intermediate scrolling frame 2230 in top level navigation window 2220 moves contents map scrolling frame 2225 in the same manner such that the position of contents map scrolling frame 2225 with respect to intermediate scrolling frame remains fixed. Dragging contents map scrolling frame 2225 in top level navigation window 2220, however, does not cause intermediate scrolling frame 2225 to move.

Intermediate navigation window 2210 displays the portion of the contents map indicated by intermediate scrolling frame 2230 in top level navigation window 2220. Intermediate navigation window 2210 contains scrolling frame 2215. Scrolling frame 2215 indicates the portion of the part of the contents map displayed in intermediate navigation window 2210 that is displayed in contents map window 2200. Dragging scrolling frame 2215 in intermediate navigation window 2210 changes the portion of the contents map displayed in contents map window 2200.

In the multi-tiered embodiment of FIG. 22, therefore, the portion of the contents map displayed in contents map window 2200 can therefore be changed by moving scrolling frame 2215 in intermediate navigation window 2210 or by moving intermediate scrolling frame 2230 and/or contents map scrolling frame 2225 in top level navigation window 2220.

In one embodiment, the scale of top level navigation window 2220 and intermediate navigation window 2210 is chosen such that individual lexia symbols can be distinctly displayed in intermediate navigation window 2210, but not necessarily in top level navigation window 2220. In one embodiment top level navigation window 2220 displays groups of lexia and/or regions containing lexia. If the search function of the embodiment of FIG. 20 is used with the embodiment of FIG. 22, all areas containing the searched for content are indicated in top level navigation window 2220. Individual lexia containing the searched for content are indicated in intermediate navigation window 2210 and in contents map window 2200.

One embodiment of the present invention allows the lexia for hypermedia works created with the present invention to be exported as hypertext markup language ("HTML") documents, for example in order to publish works on the World Wide Web or for use in intranets. In one embodiment of the present invention, an applet written in the JAVA computer language provides contents map window functionality to the resulting SML documents.

Figure 21:
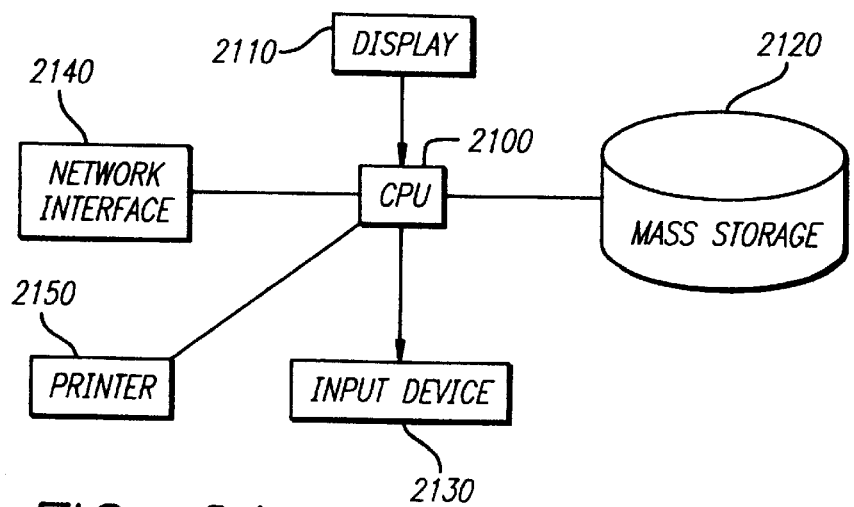
FIG. 21 is an example of a computer system that can be used to implement the present invention.

The present invention can be implemented by means of software programming on any of a variety of one or more computer systems as are well known in the art, including, without limitation, computer systems such as that shown in FIG. 21. The computer system shown in FIG. 21 includes a CPU unit 2100 that includes a central processor, main memory, peripheral interfaces, input-output devices, power supply, and associated circuitry and devices; a display device 2110 which may be a cathode ray tube display, LCD display, gas-plasma display, or any other computer display; an input device 2130, which may include a keyboard, mouse, digitizer, or other input device. The computer system may or may not include non-volatile storage 2120, which may include magnetic, optical, or other mass storage devices, and a printer 2150. The computer system may also include a network interface 2140, which may consist of a modem, allowing the computer system to communicate with other systems over a communications network such as the Internet. Any of a variety of other configurations of computer systems may also be used.

Thus a novel hypermedia authoring and publishing system has been presented. Although the present invention has been described with respect to certain example embodiments, it will be apparent to those skilled in the art that the present invention is not limited to these specific embodiments.

What is claimed is:

1. A hypermedia editing system for editing a hypermedia work comprising:
   a display screen;
   a hypermedia work display window displayed on said display screen;
   a plurality of graphical elements displayed in said hypermedia work display window, one or more of said graphical elements comprising a first special function element, said first special function element specifying a first special function wherein said graphical elements located within a first distance from said first special function element inherit from said first special function element said first special function.

2. The hypermedia editing system of claim 1 wherein items represented by said graphical elements located within said first distance from said first special function element inherit from said first special element said first special function.

3. The hypermedia editing system of claim 2 wherein said hypermedia work comprises a plurality of lexia and wherein said plurality of elements displayed in said hypermedia work display window comprise a plurality of lexia symbols representing lexia of said hypermedia work.

4. The hypermedia editing system of claim 3 wherein lexia represented by lexia symbols located within said first distance from said first special function element inherit from said first special element said first special function.

5. The hypermedia editing system of claim 4 wherein said first special function comprises applying formatting to lexia represented by lexia symbols located within said first distance from said first special function element.

6. The hypermedia editing system of claim 4 wherein said first special function comprises creating links between lexia represented by lexia symbols located within said first distance from said first special function element.

7. The hypermedia editing system of claim 6 wherein said links created between said lexia represented by lexia symbols located within said first distance from said first special function element correspond to relative positions of said lexia symbols with respect to said first special function element.

8. The hypermedia editing system of claim 7 wherein said links created between said lexia represented by lexia symbols located within said first distance from said first special function element comprise links between lexia represented by lexia symbols disposed immediately adjacent to each other.

9. The hypermedia editing system of claim 8 wherein said links created between said lexia represented by lexia symbols located within said first distance from said first special function element are represented in said lexia by link activation areas.

10. The hypermedia editing system of claim 9 wherein said link activation areas comprise link activation buttons.

11. The hypermedia editing system of claim 7 wherein said links created between said lexia represented by lexia symbols located within said first distance from said first special function element comprise links between each lexia represented by a lexia symbol located within said first distance from said first special function element and each lexia represented by each other of said lexia symbols located within said first distance from said first special function element.

12. The hypermedia editing system of claim 11 wherein said links created between said lexia represented by lexia symbols located within said first distance from said first special function element are represented in said lexia by link activation areas.

13. The hypermedia editing system of claim 12 wherein said link activation areas are represented in said lexia by lists of link activation areas.

14. The hypermedia editing system of claim 13 wherein said link activation areas comprise text labels.

15. The hypermedia editing system of claim 14 wherein said lexia comprise data fields and wherein said text labels comprise text labels extracted from said data fields of said lexia.

16. The hypermedia editing system of claim 12 wherein said link activation areas are represented in said lexia by tables of link activation areas.

17. The hypermedia editing system of claim 7 wherein said links created between said lexia represented by lexia symbols located within said first distance from said first special function element are represented in said lexia by link activation areas.

18. The hypermedia editing system of claim 6 wherein said links created between said lexia represented by lexia symbols located within said first distance from said first special function element are represented in said lexia by link activation areas.

19. The hypermedia editing system of claim 18 wherein said link activation areas comprise text labels.

20. The hypermedia editing system of claim 19 wherein said lexia comprise data fields and wherein said text labels comprise text labels extracted from said data fields of said lexia.

21. The hypermedia editing system of claim 6 wherein said first special function element is depicted in said hypermedia work display window as a bar.

22. The hypermedia editing system of claim 6 wherein said first special function element is depicted in said hypermedia work display window as a plurality of bars arranged to form a grid.

23. The hypermedia editing system of claim 4 wherein said first distance is zero.

24. The hypermedia editing system of claim 4 wherein said graphical symbols located within said first distance from said first special function element are automatically moved to said first special function element.

25. The hypermedia editing system of claim 1 wherein said graphical elements comprise a plurality of special function elements, and wherein a second special function element located within said first distance from said first special function element inherit from said first special element said first special function.

26. The hypermedia editing system of claim 25 wherein said first special function comprises applying formatting to said second special function element.

27. The hypermedia editing system of claim 26 wherein said formatting is applied to said graphical elements located within a second distance from said second special function element.

28. The hypermedia editing system of claim 25 wherein said graphical elements located within a first distance from said first special function element comprise a second special function element and an other graphical element and wherein said first special function comprises creating links between said second special function element and said other graphical element.

29. The hypermedia editing system of claim 25 wherein said graphical elements located within a first distance from said first special function element comprise a second special function element and a lexia symbol representing a lexia of said hypermedia work and wherein said first special function comprises creating a link between said second special function element and said lexia represented by said lexia symbol.

30. The hypermedia editing system of claim 1 wherein said first special function comprises applying formatting to said graphical elements located within said first distance from said first special function element.

31. The hypermedia editing system of claim 1 wherein said first special function comprises creating links between said graphical elements located within said first distance from said first special function element.

32. The hypermedia editing system of claim 31 wherein said links created between said graphical elements located within said first distance from said first special function element correspond to relative positions of said graphical elements with respect to said first special function element.

33. The hypermedia editing system of claim 32 wherein said links created between said graphical elements located within said first distance from said first special function element comprise links between said graphical elements disposed immediately adjacent to each other.

34. The hypermedia editing system of claim 32 wherein said links created between said graphical elements located within said first distance from said first special function element comprise links between each of said graphical elements located within said first distance from said first special function element and each other of said graphical elements located within said first distance from said first special function element.

35. The hypermedia editing system of claim 32 wherein said graphical elements are movable such that a graphical element located at one relative location within said first distance from said first special function element is movable to a second relative location within said first distance from said first special function element and wherein said links created according to said first special function are automatically updated to correspond to movement of said graphical element from said first relative position to said second relative position.

36. The hypermedia editing system of claim 1 wherein said graphical elements located within a first distance of said first special function element inherit from said first special element a plurality of special functions.

37. The hypermedia editing system of claim 36 wherein said plurality of special functions specified by said first special function element comprise formatting and link creation.

38. The hypermedia editing system of claim 1 wherein said first special function is user selectable from among a plurality of special functions.

39. The hypermedia editing system of claim 1 wherein said graphical elements are movable such that a graphical element located within said first distance from said first special function element is movable beyond said first distance from said first special function element to a location at which said moved graphical element no longer inherits said first special function.

40. The hypermedia editing system of claim 1 wherein said first special function element is movable, and wherein moving said first special function element causes said graphical elements located within said first distance from said first special function element to move in a corresponding manner.

41. In a computer system, a method for editing a hypermedia work comprising the steps of:
displaying a hypermedia work display window on a display screen;
displaying a plurality of graphical elements in said hypermedia work display window, said plurality of graphical elements comprising a first special function element, said first special function element specifying a first special function;
applying said first special function to one or more of said graphical elements located within a first distance from said special function element wherein said graphical elements inherit from said first special function element said first special function.

42. The method of claim 41 wherein said step of applying said first special function to said one or more graphical elements located within a first distance from said first special function element comprises the step of applying said first special function to items represented by said one or more graphical elements located within said first distance from said first special function element.

43. The method of claim 42 wherein said hypermedia work comprises a plurality of lexia and wherein said plurality of graphical elements displayed in said hypermedia work display window comprise a plurality of lexia symbols representing lexia of said hypermedia work.

44. The method of claim 43 wherein said step of applying said first special function to said one or more graphical elements located within a first distance from said first special function element comprises the step of applying said first special function to lexia represented by lexia symbols located within said first distance from said first special function element.

45. The method of claim 39 wherein said first distance is zero.

46. The method of claim 41 wherein said one or more graphical elements located within a first distance from said first special function element comprise a second special function element and wherein said step of applying said first special function to said one or more graphical elements located within a first distance from said first special function element comprises the step of applying said first special function to said second special function element.

47. The method of claim 41 wherein said first special function comprises applying formatting to said one or more graphical elements located within a first distance from said first special function element.

48. The method of claim 41 wherein said first special function comprises creating links between said one or more graphical elements located within said first distance from said first special function element.

49. The method of claim 48 wherein said links created between said one or more graphical elements located within said first distance from said first special function element correspond to relative positions of said one or more graphical elements with respect to said first special function element.

50. The method of claim 49 wherein said links created between said one or more graphical elements located within said first distance from said first special function element comprise links between each of said one or more graphical elements located within said first distance from said first special function element and each other of said one or more graphical elements located within said first distance from said first special function element.

51. The method of claim 50 wherein said one or more graphical elements located within said first distance from said first special function element comprise lexia symbols representing lexia of a hypermedia work and wherein said links created between said one or more graphical elements located within said first distance from said first special function element are represented in said lexia by link activation areas.

52. The method of claim 51 wherein said lexia comprise data fields and wherein said link activation areas comprise text labels extracted from said data fields.

53. The method of claim 51 wherein said link activation areas comprise tables of link activation areas.

54. The method of claim 49 further comprising the steps of:
moving a graphical element located at a first location within said first distance from said first special function element to a second location within said first distance from said first special function element;
updating links created according to said first special function element to correspond to said second location of said graphical element.

55. The method of claim 41 wherein said one or more graphical elements located within a first distance from said first special function element comprise a lexia symbol representing a lexia and wherein said first special function comprises creating a link between said lexia and said second special function element.

56. The method of claim 41 wherein said first special function comprises a plurality of special functions.

57. The method of claim 41 further comprising the step of moving said graphical symbols located within said first distance from said first special function element to said special function element.

58. The method of claim 41 further comprising the steps of:
moving a graphical element from within said first distance from said first special function element to without said first distance from said first special function element;
undoing application of said first special function from said moved graphical element.

59. A program storage device readable by a machine, tangibly embodying a program of instructions executable by the machine to perform method steps for editing a hypermedia work, said method comprising the steps of:
displaying a hypermedia work display window on a display screen;
displaying a plurality of graphical elements in said hypermedia work display window, said plurality of graphical elements comprising a first special function element, said first special function element specifying a first special function comprising an association to be created between said plurality of graphical elements;
applying said first special function to one or more of said graphical elements located within a first distance from said first special function element wherein one or more of said graphical elements inherit from said first special function element said first special function.

60. The program storage device of claim 59 wherein said method step of applying said first special function to said one or more graphical elements located within a first distance from said first special function element comprises the step of applying said first special function to items represented by said one or more graphical elements located within said first distance from said first special function element.

61. The program storage device of claim 60 wherein said hypermedia work comprises a plurality of lexia and wherein said plurality of graphical elements displayed in said hypermedia work display window comprise a plurality of lexia symbols representing lexia of said hypermedia work.

62. The program storage device of claim 61 wherein said method step of applying said first special function to said one or more graphical elements located within a first distance from said first special function element comprises the step of applying said first special function to lexia represented by lexia symbols located within said first distance from said first special function element.

63. The program storage device of claim 59 wherein said one or more graphical elements located within a first distance from said first special function element comprise a second special function element and wherein said method step of applying said first special function to said one or more graphical elements located within a first distance from said first special function element comprises the step of applying said first special function to said second special function element.

64. The program storage device of claim 59 wherein said first special function comprises applying formatting to said one or more graphical elements located within a first distance from said first special function element.

65. The program storage device of claim 59 wherein said first special function comprises creating links between said one or more graphical elements located within said first distance from said first special function element.

66. The program storage device of claim 65 wherein said links created between said one or more graphical elements located within said first distance from said first special function element correspond to relative positions of said one or more graphical elements with respect to said first special function element.

67. The program storage device of claim 66 wherein said links created between said one or more graphical elements located within said first distance from said first special function element comprise links between each of said one or more graphical elements located within said first distance from said first special function element and each other of said one or more graphical elements located within said first distance from said first special function element.

68. The program storage device of claim 67 in which said one or more graphical elements located within said first distance from said first special purpose element comprise lexia symbols representing lexia of a hypermedia work and wherein said links created between said one or more graphical elements located within said first distance from said first special function element are represented in said lexia by link activation areas.

69. The program storage device of claim 68 wherein said lexia comprise data fields and wherein said link activation areas comprise text labels extracted from said data fields.

70. The program storage device of claim 68 wherein said link activation areas comprise lists of link activation areas.

71. The program storage device of claim 68 wherein said link activation areas comprise tables of link activation areas.

72. The program storage device of claim 66 wherein said method further comprises the steps of:
   moving a graphical element located at a first location within said first distance from said first special function element to a second location within said first distance from said first special function element;
   updating links created according to said first special function element to correspond to said second location of said graphical element.

73. The program storage device of claim 59 wherein said one or more graphical elements located within a first distance from said first special function element comprise a lexia symbol representing a lexia and wherein said first special function comprises creating a link between said lexia and said second special function element.

74. The program storage device of claim 59 wherein said first special function comprises a plurality of special functions.

75. The program storage device of claim 59 wherein said first distance is zero.

76. The program storage device of claim 59 further comprising the step of moving said one or more graphical symbols located within said first distance from said first special function element to said first special function element.

77. The program storage device of claim 59 wherein said method further comprises the steps of:
   moving a graphical element from within said first distance from said first special function element to without said first distance from said first special function element;
   undoing application of said first special function from said moved graphical element.

* * * * *